United States Patent
Hashiguchi et al.

(10) Patent No.: US 8,706,882 B2
(45) Date of Patent: Apr. 22, 2014

(54) APPARATUS AND METHOD FOR ALLOCATING DEVICES TO A COMMUNICATION ROUTE

(75) Inventors: Tomohiro Hashiguchi, Kawasaki (JP); Kazuyuki Tajima, Kawasaki (JP); Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 13/218,853

(22) Filed: Aug. 26, 2011

(65) Prior Publication Data

US 2012/0079116 A1   Mar. 29, 2012

(30) Foreign Application Priority Data

Sep. 28, 2010 (JP) ................................. 2010-216412

(51) Int. Cl.
*G06F 15/173* (2006.01)
(52) U.S. Cl.
USPC .......................................... 709/226; 709/223
(58) Field of Classification Search
USPC ................................................ 709/226, 223
See application file for complete search history.

(56) References Cited

U.S. PATENT DOCUMENTS

2010/0061722 A1   3/2010   Hashiguchi et al.

FOREIGN PATENT DOCUMENTS

JP   2009-038087   2/2009
JP   2010-66823    3/2010

OTHER PUBLICATIONS

Japanese Office Action mailed Jan. 21, 2014 in corresponding Japanese Application No. 2010-216412.
JUSE Press Ltd., "Linear Programming", Aug. 5, 1996, pp. 64-72.

*Primary Examiner* — Hee Soo Kim
(74) *Attorney, Agent, or Firm* — Staas & Halsey LLP

(57) ABSTRACT

There is provided an apparatus and method for allocating devices to a communication route. Network topology information and device information including a device-cost assigned to each of candidate-devices allowed to be allocated to a plurality of segments on the communication route are provided. An integer/linear programming problem is generated to obtain a feasible device-allocation, and an objective function for calculating an objective function value is defined. A sequence of feasible device-allocations are generated by sequentially generating a next feasible device-allocation from a current feasible device-allocation while improving an objective function value until the objective function value is not improved any more, and the last one of the sequence of feasible device-allocations is determined to be an optimum device-allocation. The next feasible device-allocation is generated from the current feasible device-allocation by replacing a basic candidate-device with an alternative candidate-device selected based on reduced-costs calculated for nonbasic candidate-devices.

7 Claims, 16 Drawing Sheets

FIG. 5

| (ROW) | X | x1 | x2 | x3 | x4 | x5 | x6 | x7 | x8 | x9 | x10 | x11 | x12 | x13 | x14 | x15 | x16 | x17 | x18 | ne1 | pe1 | ne2 | pe2 | ne3 | pe3 |
|---|---|---|---|---|---|---|---|---|---|---|---|---|---|---|---|---|---|---|---|---|---|---|---|---|---|
| 1 |   |   |   |   |   |   |   |   |   |   |   |   |   |   |   |   |   |   |   |   |   |   |   |   |   |
| 2 | c | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| 3 |   | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 |   | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 |
| 5 |   | 0 | 0 | 0 | 0 | 0 | 0 | 1 | 1 | 1 | 0 | 0 | 0 | 0 | 0 | 0 | 0 | 0 | 0 | 0 | 0 | 0 | 0 | 0 | 0 |
| 6 |   | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| 7 | A | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 |
| 8 |   | 0 | 0 | 0 | 0 | 0 | 0 | 0 | 0 | 0 | 0 | 0 | 0 | 0 | 0 | 0 | 1 | 1 | 1 | 0 | 0 | 0 | 0 | 0 | 0 |
| 9 |   | 1 | 2 | 3 | 7 | 8 | 9 | 4 | 5 | 6 | 11 | 12 | 13 | 2 | 3 | 0 | 9 | 10 | 11 | 1 | -1 | 0 | 0 | 0 | 0 |
| 10 |   | 0 | 0 | 0 | 0 | 0 | 0 | 4 | 5 | 6 | 11 | 12 | 13 | 2 | 3 | 0 | 0 | 0 | 0 | 0 | 0 | 1 | -1 | 0 | 0 |
| 11 |   | 1 | 2 | 3 | 7 | 8 | 9 | 4 | 5 | 6 | 11 | 12 | 13 | 2 | 3 | 0 | 10 | 11 | 12 | 0 | 0 | 0 | 0 | 1 | -1 |
| 12 | c^ | 0 | -2 | -4 | 0 | -2 | -4 | 0 | -3 | -6 | 0 | -2 | -4 | 0 | -2 | 0 | -1 | -2 | -3 |   |   |   |   |   |   |

| | b |
|---|---|
| | 1 |
| | 1 |
| | 1 |
| | 1 |
| | 1 |
| | 1 |
| | 15 |
| | 20 |
| | 40 |

Segments: 1', 2', 3', 4', 5', 6'

FIG. 6A

| (ROW) | xB cB | x1 | x4 | x7 | x10 | x13 | x15 | ne1 | ne2 | ne3 |
|---|---|---|---|---|---|---|---|---|---|---|
| 1 | | 0 | 0 | 0 | 0 | 0 | 0 | 0 | 1 | 1 |
| 2 | | 1 | | | | | | | | |
| 3 | | | 1 | | | | | | | |
| 4 | | | | 1 | | | | | | |
| 5 | B | | | | 1 | | | | | |
| 6 | | | | | | 1 | | | | |
| 7 | | 1 | | | | | 1 | | | |
| 8 | | 1 | 7 | 4 | 11 | 2 | | 1 | | |
| 9 | | 1 | 7 | 4 | 11 | 2 | 9 | | | 1 |

FIG. 6B

| (ROW) | | | | | | | | | |
|---|---|---|---|---|---|---|---|---|---|
| 1 | 1 | | | | | | | | |
| 2 | | 1 | | | | | | | |
| 3 | | | 1 | | | | | | |
| 4 | | | | 1 | | | | | |
| 5 | | | | | 1 | | | | |
| 6 | | | | | | 1 | | | |
| 7 | -1 | -7 | -4 | | | | 1 | | |
| 8 | | | -4 | -11 | -2 | | | 1 | |
| 9 | -1 | -7 | -4 | -11 | -2 | -9 | | | 1 |

| n | -2 | -14 | -12 | -22 | -4 | -9 | 1 | 1 | 1 |
|---|---|---|---|---|---|---|---|---|---|

FIG. 7

| (ROW) | xB | COST | x1 1 | x4 7 | x7 4 | x10 11 | x13 2 | x15 9 | | TOTAL COST | OBJECTIVE COST | COST-DIFFERENCE |
|---|---|---|---|---|---|---|---|---|---|---|---|---|
| 1 | | | | | | | | | | 12 | 15 | 3 |
| 2 | | | 1 | 1 | | | | | | 17 | 20 | 3 |
| 3 | | | | | 1 | | | | | 34 | 40 | 6 |
| 4 | | | | | | 1 | | | | | | |
| 5 | B | | | | | | 1 | | | | | |
| 6 | | | | | | | | 1 | | | | |
| 7 | | | 1 | 7 | 4 | 11 | 2 | | 1 | | | |
| 8 | | | | | | | | | 1 | | | |
| 9 | | | 1 | 7 | 4 | 11 | 2 | 9 | | | | |

| OBJECTIVE FUNCTION VALUE |
|---|
| 12 |

FIG. 8B

REDUCED-COSTS #5

| x  | x1 | x2 | x3 | x4 | x5 | x6 | x7 | x8 | x9 | x10 | x11 | x12 | x13 | x14 | x15 | x16 | x17 | x18 |
|----|----|----|----|----|----|----|----|----|----|-----|-----|-----|-----|-----|-----|-----|-----|-----|
| c^ | -4 | -2 | 0  | 0  | 2  | 4  | -6 | -3 | 0  | -4  | -2  | 0   | 0   | 0   | -3  | -2  | -1  | 0   |

OBJECTIVE FUNCTION VALUE: 5

DEVICE-ALLOCATION (5)

| xB   | x3 | x4 | x9 | x12 | x13 | x18 |
|------|----|----|----|-----|-----|-----|
| COST | 3  | 7  | 6  | 13  | 2   | 12  |

○

REDUCED-COSTS #6

| x  | x1 | x2 | x3 | x4 | x5 | x6 | x7 | x8 | x9 | x10 | x11 | x12 | x13 | x14 | x15 | x16 | x17 | x18 |
|----|----|----|----|----|----|----|----|----|----|-----|-----|-----|-----|-----|-----|-----|-----|-----|
| c^ | 0  | 0  | 0  | 0  | 0  | 0  | -2 | -1 | 0  | 0   | 0   | 0   | 0   | 0   | -1  | -2  | -3  |     |
|    |    |    |    |    |    | *  |    | ↑  |    |     |     |     |     |     | *   | *   |     |     |

OBJECTIVE FUNCTION VALUE: 2

DEVICE-ALLOCATION (6)

| xB   | x3 | x4 | x9 | x12 | x13 | x15 |
|------|----|----|----|-----|-----|-----|
| COST | 3  | 7  | 6  | 13  | 2   | 9   |

REDUCED-COSTS #7

| x  | x1 | x2 | x3 | x4 | x5 | x6 | x7 | x8 | x9 | x10 | x11 | x12 | x13 | x14 | x15 | x16 | x17 | x18 |
|----|----|----|----|----|----|----|----|----|----|-----|-----|-----|-----|-----|-----|-----|-----|-----|
| c^ | 4  | 2  | 0  | 0  | -2 | -4 | 3  | 0  | -3 | 4   | 2   | 0   | 0   | -2  | 0   | -1  | -2  | -3  |
|    |    |    |    |    | *  |    |    |    | *  |     |     |     |     | *   |     | ↑   |     | *   |

OBJECTIVE FUNCTION VALUE: 1

DEVICE-ALLOCATION (7)

| xB   | x3 | x4 | x8 | x12 | x13 | x15 |
|------|----|----|----|-----|-----|-----|
| COST | 3  | 7  | 5  | 13  | 2   | 9   |

○

REDUCED-COSTS #8

| x  | x1 | x2 | x3 | x4 | x5 | x6 | x7 | x8 | x9 | x10 | x11 | x12 | x13 | x14 | x15 | x16 | x17 | x18 |
|----|----|----|----|----|----|----|----|----|----|-----|-----|-----|-----|-----|-----|-----|-----|-----|
| c^ | 4  | 2  | 0  | 0  | -2 | -4 | 3  | 0  | -3 | 4   | 2   | 0   | 0   | -2  | 1   | 0   | -1  | -2  |

OBJECTIVE FUNCTION VALUE: 0

DEVICE-ALLOCATION (8)

| xB   | x3 | x4 | x8 | x12 | x13 | x16 |
|------|----|----|----|-----|-----|-----|
| COST | 3  | 7  | 5  | 13  | 2   | 10  |

DEVICE-ALLOCATION (1)

| xB | x1 | x4 | x7 | x10 | x13 | x15 |
|---|---|---|---|---|---|---|
| COST | 1 | 7 | 4 | 11 | 2 | 9 |

OBJECTIVE FUNCTION VALUE: 12

REDUCED-COSTS #1

| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 0 | -2 | -4 | 0 | -2 | -4 | 0 | -3 | -6 | 0 | -2 | -4 | 0 | -2 | 0 | -1 | -2 | -3 |

⇨  ○

DEVICE-ALLOCATION (2)

| xB | x1 | x4 | x8 | x10 | x13 | x15 |
|---|---|---|---|---|---|---|
| COST | 1 | 7 | 5 | 11 | 2 | 9 |

OBJECTIVE FUNCTION VALUE: 9

REDUCED-COSTS #2

| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 0 | -2 | -4 | 0 | -2 | -4 | 3 | 0 | -3 | 0 | -2 | -4 | 0 | -2 | 0 | -1 | -2 | -3 |

⇨  ○

DEVICE-ALLOCATION (3)

| xB | x2 | x4 | x8 | x10 | x13 | x15 |
|---|---|---|---|---|---|---|
| COST | 2 | 7 | 5 | 11 | 2 | 9 |

OBJECTIVE FUNCTION VALUE: 7

REDUCED-COSTS #3

| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 2 | 0 | -2 | 0 | -2 | -4 | 3 | 0 | -3 | 0 | -2 | -4 | 0 | -2 | 0 | -1 | -2 | -3 |

⇨  ○

DEVICE-ALLOCATION (4)

| xB | x2 | x5 | x8 | x10 | x13 | x15 |
|---|---|---|---|---|---|---|
| COST | 2 | 8 | 5 | 11 | 2 | 9 |

OBJECTIVE FUNCTION VALUE: 5

REDUCED-COSTS #4

| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 2 | 0 | -2 | 2 | 0 | -2 | 3 | 0 | -3 | 0 | -2 | -4 | 0 | -2 | 0 | -1 | -2 | -3 |

FIG. 12B
DEVICE-ALLOCATION (4)
| xB | x2 | x4 | x9 | x10 | x13 | x15 |
|---|---|---|---|---|---|---|
| COST | 2 | 7 | 6 | 11 | 2 | 9 |
OBJECTIVE FUNCTION VALUE: 4
REDUCED-COSTS #4
| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 2 | 0 | -2 | 0 | -2 | -4 | 6 | 3 | 0 | 0 | -2 | -4 | 0 | -2 | 0 | -1 | -2 | -3 |
|  |  |  | * |  | * |  |  |  |  |  |  | ← |  |  |  |  | ←--- | ←--- |
DEVICE-ALLOCATION (5)
| xB | x2 | x4 | x9 | x11 | x13 | x15 |
|---|---|---|---|---|---|---|
| COST | 2 | 7 | 6 | 12 | 2 | 9 |
OBJECTIVE FUNCTION VALUE: 2
REDUCED-COSTS #5
| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 2 | 0 | -2 | 0 | -2 | -4 | 6 | 3 | 0 | 2 | 0 | -2 | 0 | -2 | 0 | -1 | -2 | -3 |
|  |  |  | * |  | * | * |  |  |  |  |  |  |  |  |  |  | * | ← |
DEVICE-ALLOCATION (6)
| xB | x2 | x4 | x9 | x11 | x13 | x17 |
|---|---|---|---|---|---|---|
| COST | 2 | 7 | 6 | 12 | 2 | 11 |
OBJECTIVE FUNCTION VALUE: 0
REDUCED-COSTS #6
| x | x1 | x2 | x3 | x4 | x5 | x6 | x7 | x8 | x9 | x10 | x11 | x12 | x13 | x14 | x15 | x16 | x17 | x18 |
|---|---|---|---|---|---|---|---|---|---|---|---|---|---|---|---|---|---|---|
| c^ | 2 | 0 | -2 | 0 | -2 | -4 | 6 | 3 | 0 | 2 | 0 | -2 | 0 | -2 | 0 | -1 | -2 | -3 |

APPARATUS AND METHOD FOR ALLOCATING DEVICES TO A COMMUNICATION ROUTE

CROSS-REFERENCE TO RELATED APPLICATION

This application is based upon and claims the benefit of priority of the prior Japanese Patent Application No. 2010-216412, filed on Sep. 28, 2010, the entire contents of which are incorporated herein by reference.

FIELD

The present invention relates to an apparatus and method for allocating devices to a communication route.

BACKGROUND

As for a network that is used, for example, as a mobile communication system, there exists the minimum device configuration required for handling traffic that flows in the network. The device configuration for the network includes, for example, a signal transfer point that is an apparatus for handling a signal transmission.

In general, there may be a trade-off relationship between a cost needed for such a signal-transmitting device allocated to the network and the transmission quality for signals that are transmitted via the signal-transmitting device. Here, for example, the cost indicates the amount of compensation that is made, by a signal-transmitting device, for degradation of transmission signals, and, hereinafter, a cost will be also expressed as "a device-cost." In other words, the transmission quality for signals are improved when signal-transmitting devices of high costs are allocated to the network, thereby decreasing the number of signal-transmitting devices to be allocated to a communication route through which signals are transmitted. On the other hand, the total number of signal-transmitting devices to be allocated to the network increases with increasing the number of signal-transmitting devices of low costs.

Further, in the light of assuring reliability required for a network, a network configuration in which the total cost is greatly lower than the above mentioned cost required for handling traffic on the network may not be accepted.

In consideration of the above mentioned aspect required for a network configuration, when designing a network, it is preferable to approximate the total sum of device-costs for signal-transmitting devices, in other words, a cost required for constructing the network, to an objective value that is determined based on traffic that flows through each of traffic-routes on the network. In order to design a network in the above mentioned manner, a method that designs a network using an integer/linear programming method has been proposed.

Japanese Laid-open Patent Publication No. 2009-38087 discloses a method in which a method for allocating components to a board is modeled as an integer/linear programming problem, and the allocation of components is determined by solving the integer/linear programming problem.

In the case of designing a network, by solving a mathematical programming problem, such as an integer/linear programming problem, device-allocation to the network may be determined so as to minimize a cost-difference between an objective cost for a traffic-route and the total sum of device-costs of devices allocated to the traffic-route becomes minimum. Further, the mathematical programming problem allows device-allocation to be determined so that the difference between the total sum of cost-differences for a plurality of traffic-routes and an objective value (also called an objective function value) set for the network becomes minimum, thereby enabling a preferred network design.

However, there is a technical problem, in determining device-allocation to the network by solving a mathematical programming problem, that processing load needed for solving the mathematical programming problem increases with increasing the number of devices to be allocated to the network.

For example, in the case of changing the current allocation of single device among a large number of devices, an objective function value needs to be re-calculated to obtain the objective function value after changing the current allocation of the single device. Further, in order to determine whether changing the allocation of the single device is suitable for the network design, the objective function value needs to be re-calculated for all the changes of devices. This requires a large amount of processing load.

SUMMARY

According to an aspect of an embodiment, there is provided an apparatus and method for allocating devices to a communication route. Network topology information defining the communication route and device information including a device-cost assigned to each of candidate-devices allowed to be allocated to a plurality of segments on the communication route are provided. An integer/linear programming problem is generated to obtain a feasible device-allocation allowing the candidate-devices to be allocated to the communication route under constraints determined based on the network topology information and the device information. The integer/linear programming problem defines an objective function for calculating an objective function value. A sequence of feasible device-allocations are generated by sequentially generating a next feasible device-allocation from a current feasible device-allocation while improving the objective function value until the objective function value is not improved any more. The last one of the sequence of feasible device-allocations is determined to be an optimum device-allocation having an optimum objective function value. Here, the next feasible device-allocation is generated by replacing a basic candidate-device being used for the current feasible device-allocation with an alternative candidate-device so as to improve the objective function value, the alternative candidate-device being selected, from nonbasic candidate-devices not being used for the current feasible device-allocation, based on reduced-costs calculated for the nonbasic candidate-devices, a reduced-cost indicating a degree of a change in the objective function value when the change is caused by replacing a basic candidate-device with a nonbasic candidate-device having the reduced-cost.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 5 is a diagram illustrating an example of a device-allocation table for defining an integer/linear programming problem, according to an embodiment;

FIGS. 6A, 6B, 6C are diagrams illustrating examples of matrix data for calculating a reduced-cost, according to an embodiment;

FIG. 7 is a schematic diagram illustrating an example of relationship between a device-allocation and an objective function value, according to an embodiment;

FIGS. 8A, 8B are diagrams illustrating an example of a sequence of feasible device-allocations that converge on an optimum device-allocation, according to a first embodiment;

FIGS. 12A, 12B are diagrams illustrating an example of a sequence of feasible device-allocations that converge on an optimum device-allocation, according to a third embodiment.

DESCRIPTION OF EMBODIMENTS

Figure 1:
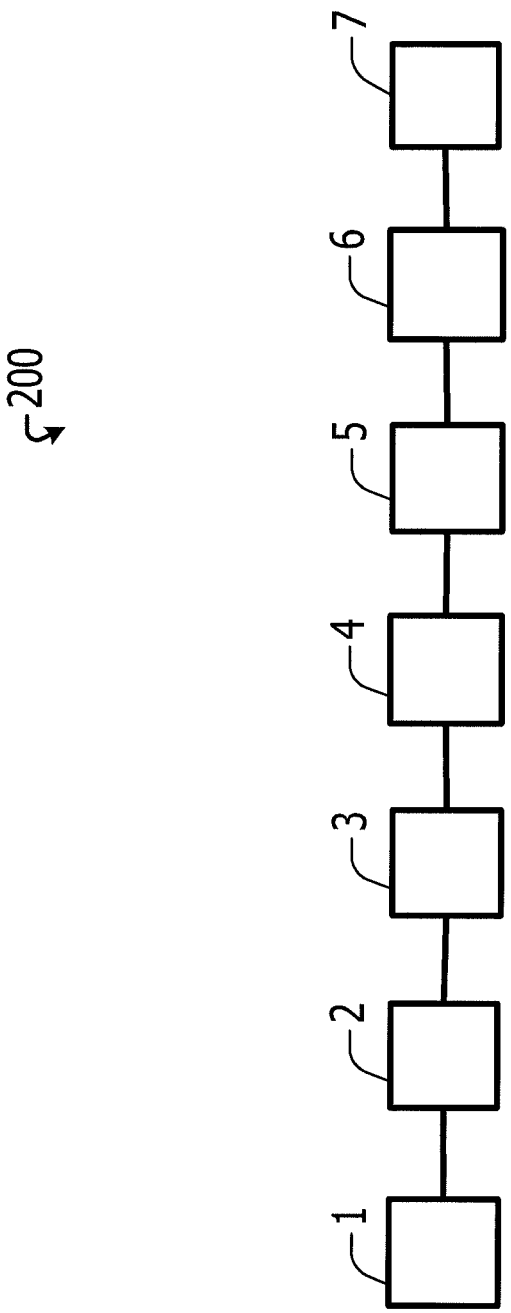
FIG. 1 is a diagram illustrating an example of a communication route to which devices are to be allocated, according to an embodiment.

FIG. 1 is a diagram illustrating an example of a communication route to which devices are to be allocated, according to an embodiment. In FIG. 1, network 200 indicates a part of a communication network that constitutes, for example, a mobile communication system. In the case, network 200 indicates a communication route along which nodes 1 to 7, such as a signal branching unit or a signal transfer unit, are arranged. Although network 200 of FIG. 1 indicates a communication route that is included, for example, in a so-called mesh network, network 200 may be a communication route included in a different type of network.

A communication route consists of one or more segments that are linearly connected to each other, and may be formed by making a cascade connection between two or more nodes. In the example of FIG. 1, it is assumed that nodes 1 to 7 are connected such that signals output from nodes 1, 2, 3, 4, 5, 6 are input to nodes 2, 3, 4, 5, 6, 7, respectively. That is, it is assumed that a propagation direction of a signal along the communication route is from node 1 toward node 7. Hereinafter, description will be given of examples in which signals flow from node 1 towards node 7. However, the embodiment is also applied to the case where a propagation direction of a signal along the communication route is reversed or bidirectional.

A network designing apparatus according to an embodiment determines an allocation of devices, such a signal transmitting device, that are allowed to be allocated to a plurality of segments along a communication route in network 200. In the example of FIG. 1, the communication route consists of six segments, and, hereinafter, it is assumed that a device, such as a signal transmission device, is allocated to receiving ports of nodes. Further, a device that is allowed to be allocated to a plurality of segments along the communication route will be described as "a candidate-device".

Each of candidate-devices that are allowed to be allocated to a plurality of segments along a communication route has a device-cost indicating, for example, the amount of compensation that is made, by a candidate-device, for degradation of transmission signals. When a candidate-device having a high device-cost is actually allocated, transmission quality for signals that are transmitted via the candidate-device may be greatly improved. On the other hand, when a candidate-device having a low device-cost is actually allocated, great improvement in transmission quality may not be expected.

In network 200, an objective-cost needed for handling traffic may be set for each of traffic-routes where a traffic-route is defined as a sequence of adjacent segments along a communication route. The objective-cost indicates a cost needed for handling a predicted traffic volume that is obtained by a simulation or statistical processing. Although a certain amount of fluctuating range may be allowed as to the objective-cost for a traffic-route, it is preferable to design network 200 so that the total sum of device-costs of devices that are allocated to the traffic-route comes close to the objective-cost to the utmost extent.

As will be described hereinafter, network-designing apparatus 100 according to an embodiment may be configured to determine a device-allocation having, for each of traffic-routes along a communication route in the network 200, a total sum of device-costs that is closer to an objective-cost for the each of traffic-routes.

Figure 2:
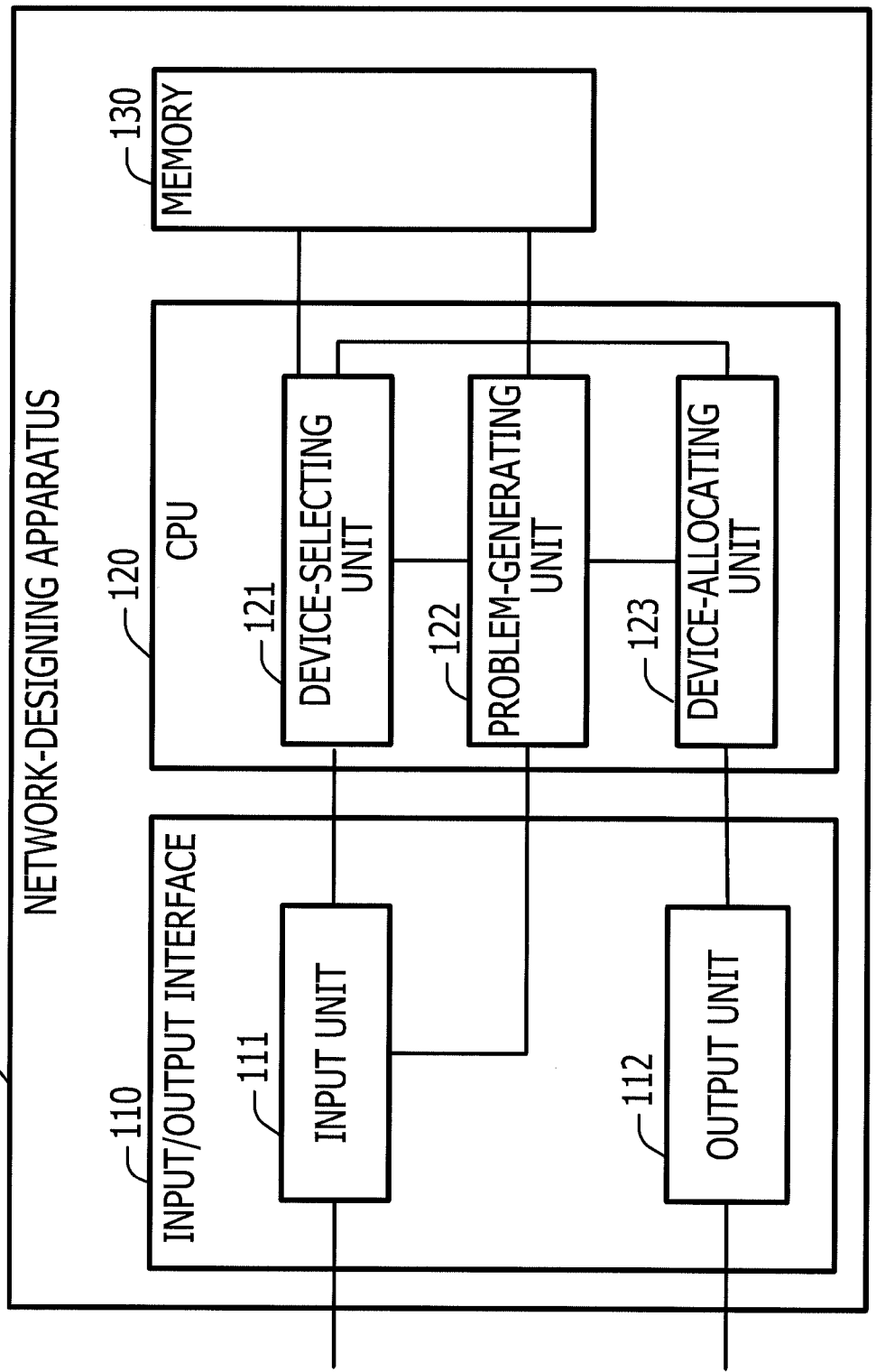
FIG. 2 is a diagram illustrating a configuration example of a network designing apparatus, according to an embodiment.

FIG. 2 is a diagram illustrating a configuration example of a network-designing apparatus, according to an embodiment.

As depicted in FIG. 2, network-designing apparatus 100 according to an embodiment may be configured to include input/output interface 110, CPU 120, and memory 130.

Input/output interface 110 is an interface for performing data-input/output processing, for example, from/to an external network-node apparatus or a computer, and may be configured to include input unit 111 and output unit 112.

Input unit 111 inputs, from the outside of network-designing apparatus 100, for example, network topology information defining a communication route to be designed, device information on candidate-devices that are allowed to be allocated to a communication route in network 200, and traffic information on the communication route, such as an objective-cost for each of traffic-routes along the communication route, and outputs the input information to CPU 120. Here, the device information includes, for example, device-costs of candidate-devices that are allowed to be allocated to a plurality of segments along the communication route.

Output unit 112 outputs, to outside network-designing apparatus 100, information on the optimum device-allocation that has been calculated by CPU 120.

CPU 120 serves as operational equipment for controlling each of components within network-designing apparatus 100, and calculates an optimum device-allocation by processing the input information. CPU 120 may be configured to include, for example, device-selecting unit 121, problem-generating unit 122, and device-allocating unit 123.

Device-selecting unit 121 generates information on candidate-devices for calculating an optimum device-allocation to a communication route in network 200, based on device information input from input unit 111. Further, it is also possible for device-selecting unit 121 to store the generated information on candidate-devices, as a data base, in memory 130.

Problem-generating unit 122 generates a mathematical programming problem for obtaining a feasible device-allocation, such as an integer/linear programming problem, based on network topology information, device information, and traffic information that have been input from input unit 111. Further, problem-generating unit 122 may be configured to store, in memory 130, the network topology information, the device information, and the traffic information that have been input from input unit 111, along with the generated mathematical programming problem.

Device-allocating unit 123 calculates an optimum device-allocation to a communication route in network 200, based on the information generated by device-selecting unit 121 and the mathematical programming problem generated by problem-generating unit 122. Device-allocating unit 123 may be configured, for example, to determine an optimum device-allocation by solving the mathematical programming problem using candidate-devices selected based on reduced-costs.

Memory 130 serves as a storage device for storing software by which CPU 120 is executed, and for storing a variety of information needed for operating network-designing apparatus 100.

Figure 3:
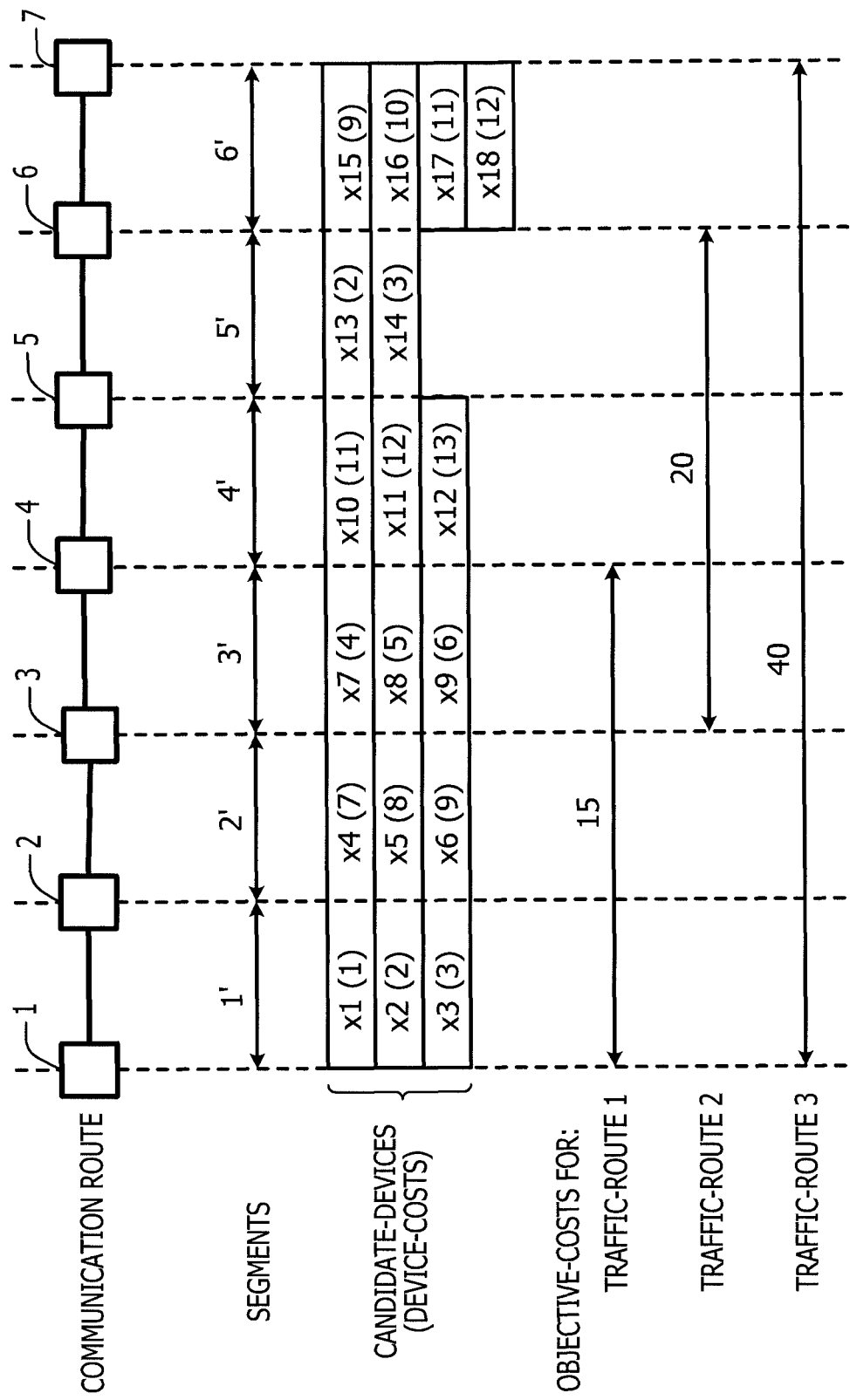
FIG. 3 is a diagram illustrating an example of an integer/linear programming problem to be solved for determining an optimum device-allocation, according to an embodiment.

FIG. 3 is a diagram illustrating an example of an integer/linear programming problem to be solved for determining an optimum device-allocation, according to an embodiment. In FIG. 3, an example of a mathematical programming problem is depicted in association with network topology information indicating a communication route on network 200 depicted in FIG. 1.

As depicted in FIG. 3, problem-generating unit 122 generates segment information that identifies each of a plurality of segments to which candidate-devices are allowed to be allocated, based on network topology information, device information, and traffic information that have been input from input unit 111. In the example of FIG. 3, problem-generating unit 122 divides a communication route (network 200) of FIG. 1 into segments 1', 2', 3', 4', 5', 6' that are positioned between nodes 1 and 2, 2 and 3, 3 and 4, 4 and 5, 5 and 6, 6 and 7, respectively. Devices such as a signal-transmitting device may be allocated, for example, to a receiving port or output port of a node. Therefore, for example, when a device is allocated to a receiving port of node 2, it means that the device is allocated to a segment 1' between nodes 1 and 2.

Further, problem-generating unit 122 sets an objective-cost for each of traffic-routes. In the example of FIG. 3, an objective-cost for traffic-route 1 (consisting of a sequence of segments 1' to 3') is set at 15, an objective-cost for traffic-route 2 (consisting of a sequence of segments 3' to 5') is set at 20, and an objective-cost for traffic-route 3 (consisting of a sequence of segments 1' to 6') is set at 40.

Device-selecting unit 121 notifies device-allocating unit 123 of a device-identifier (device-ID) and device-cost for candidate-devices that are allowed to be allocated to each of a plurality of segments. In FIG. 3, a device-ID is denoted by "xn" where n is a natural number ranging from 1 to 18. The example of FIG. 3 illustrates that candidate-devices x1, x2, x3 are allowed to be allocated to segment 1', candidate-devices x4, x5, x6 are allowed to be allocated to segment 2', candidate-devices x7, x8, x9 are allowed to be allocated to segment 3', candidate-devices x10, x11, x12 are allowed to be allocated to segment 4', candidate-devices x13, x14 are allowed to be allocated to segment 5', and candidate-devices x15, x16, x17, x18 are allowed to be allocated to segment 6', where a figure in parenthesis appended to each of device-IDs indicates a device-cost of the corresponding candidate-device.

Problem-generating unit 122 refers to, device-IDs for candidate-devices that are allowed to be allocated to a plurality of segments, and device-costs of the candidate-devices, where the device-IDs and device-costs of the candidate-devices are input from device-selecting unit 121. Problem-generating unit 122 further refers to information on traffic-routes and an objective-cost for each of the traffic-routes, which may be included in traffic information. Then, problem-generating unit 122 generates, based on the above referred information, an integer-programming problem as defined by formulas (1) to (3).

In a mathematical programming approach, suitable allocation of devices is determined by solving the above mentioned integer/linear programming problem, and a device to be allocated to a segment is selected from candidate-devices that are allowed to be allocated to the segment, for example, based on a device-cost assigned to the device and an objective-cost set for a traffic-route including the segment. FIG. 3 illustrates an example of a network topology in which single device is allocated to each of a plurality of segments. In this way, problem-generating unit 122 generates constraint formulas used for determining a feasible device-allocation, by which, for example, objective-costs and the number of devices to be allocated to each of the plurality of segments are defined.

Device-allocating unit 123 solves the integer/linear programming problem so that an objective function value, which is calculated based on a mathematical programming method, becomes an optimum value (for example, a maximum value or a minimum value) under conditions indicated by the constraints formulas, thereby determining an optimum device-allocation.

In the example described below, device-allocating unit 123 obtains, for each of traffic-routes, a cost-difference between an objective-cost of the each traffic-route and the total sum of device-costs of devices allocated to the each traffic-route, and defines an objective function value as the total sum of absolute cost-differences obtained for all the traffic-routes. Device-allocating unit 123 generates a sequence of feasible device-allocations so that the generated feasible device-allocation comes close to the objective function value to the extent possible. As a result, device-allocating unit 132 obtains a feasible device-allocation that minimizes the objective function value under conditions indicated by the constraint formulas. Then device-allocating unit 132 determines the obtained feasible device-allocation to be an optimum device-allocation that allows candidate-devices to be optimally allocated to a communication route.

Next, description will be given of an integer/linear programming problem for determining an optimum device-allocation and a solving method thereof.

Problem-generating unit 122, for example, generates an integer/linear programming problem based on a network topology generated as depicted in FIG. 3.

Problem-generating unit 122 acquires, for example, information on a plurality of segments and traffic-routs along a communication route, device identifiers identifying candidate-devices that are allowed to be allocated to the plurality of segments, device-costs of the candidate-devices, and an objective-cost set for each of the traffic-routes. Then, problem-generating 122 generates an integer/linear programming problem that is to be solved under the condition single device is selected from candidate-devices that are allowed to be allocated to each of a plurality of segments. Further, an objective function value is defined so that the total sum of device-costs of devices allocated to a communication route comes close to the total sum of objective-costs defined for traffic-routes. For example, the objective function value may be defined as the total sum of absolute cost-differences where a cost-difference is a difference between an objective-cost for a traffic-route and the total sum of device-costs of devices that are allocated to the traffic-route.

An integer/linear programming problem may be represented, for example, as a set of formulas that include an objective function for calculating an objective function value and restriction formulas to which the objective function is subjected. Formula (1) described below represents an objective function for an integer/linear programming problem that is generated by problem-generating unit 122 and to be solved by device-allocating unit 123.

$$\text{Minimize} \sum_t w(t) \cdot (pe(t) + ne(t)) \quad \text{Formula (1)}$$

In formula (1), pe(t) and ne(t) are non-negative variables indicating a cost-difference between an objective-cost for a traffic-route and the total sum of device-costs of devices allocated to the traffic-route. Here, pe(t) indicates a positive component of the cost-difference, ne(t) indicates a negative component of the cost-difference, and "pe(t)+ne(t)" indicates the absolute value of the cost-difference. Indicator t indicates a predetermined traffic-route along a communication route (in network 200) along which traffic occurs. Constant w(t) is a weighing coefficient for weighing the absolute value of a cost-difference between the objective-cost for traffic t and the total sum of device-costs of devices allocated to traffic-route t. Weighing coefficient w(t), for example, allows some candidate-devices to be allocated, on a priority basis, to a specific traffic-route that is determined depending on priority assigned to each of the traffic-routes. Weighing coefficient w(t) may be set, for example, by device-selecting unit 121, problem-generating unit 122, or device-allocating unit 123. Further, it is also possible to set a priority level for determining device-allocation in a manner different from the above mentioned manner. Hereinafter, for ease of explanation, it is assumed that weighing coefficient w(t) is set at a fixed value of 1.

Constraint formulas defines constraint conditions for an objective function of formula (1), and may be represented, for example, by the following formulas (2) and (3).

$$\sum_{c \text{ on } s} x(c) = 1 \text{ for } \forall s \in \text{segment} \quad \text{Formula (2)}$$

$$\sum_{c \text{ on } t} \text{cost}(c) \cdot x(c) - pe(t) + ne(t) = \quad \text{Formula (3)}$$

$$\text{ideal\_cost}(t) \text{ for } \forall t \in \text{Traffic}$$

Formula (2) is a constraint formula defining a condition that single device is selected from candidate-devices allowed to be allocated to each of a plurality of segments (for example, segments 1' to 6' depicted in FIG. 3). In formula (2), x(c) is a variable indicating whether candidate-device c is selected to be allocated to segment s or not. "x(c)=1" indicates that candidate-device c is selected as a device to be allocated to segment s, and "x(c)=0" indicates that candidate-device c is not selected as a device to be allocated to segment s. Therefore, constraint formula (2) indicates that single candidate-device is selected, as a device to be allocated to segment s, from all the candidate-devices that are allowed to be allocated to segment s, where s indicates any one of all the segments (for example, segments 1' to 6' in FIG. 3).

Formula (3) is a constraint formula for determining a cost-difference between an objective-cost set for a traffic-route and the total sum of device-costs of devices allocated to the traffic-route. In formula (3), "ideal_cost(t)" indicates the given objective-cost that was beforehand set for predetermined traffic-route t. "cost(c)" indicates a device-cost of candidate-device c. The product of cost(c) and x(c) indicates an effective device-cost of candidate-device c when candidate-device c is allocated to traffic-route t. That is, the product of cost(c) and x(c) becomes cost(c) when candidate-device c is allocated to traffic-route t, and the product of cost(c) and x(c) becomes 0 when candidate-device c is not allocated to traffic-route t. Further, the total sum of effective device-costs of all the devices allocated to segments along traffic-route t is represented by "Σcost(c)*x(c)" in formula (3) where "*" means a multiplication sign. Therefore, according to formula (3), the cost-difference between the objective-cost for traffic-route t and the total sum of device-costs of devices allocated to segments along traffic-route t is represented by "−pe(t)+ne(t)". Because of formula (3), the absolute cost difference between the objective-cost for traffic-route t and the total sum of device-costs of devices allocated to segments along traffic-route t "|−pe(t)+ne(t)|" is determined as "pe(t)+ne(t)". This is because of non-negative definitions of pe(t) and ne(t), and the objective function (formula (1)) to minimize the sum of pe(t) and ne(t). That is, when the cost difference "−pe(t)+ne(t)" is positive, pe(t) and ne(t) are determined as 0 and the absolute value of the cost difference, respectively, and when the cost difference is negative, pe(t) and ne(t) are determined as the absolute value of the cost difference and 0, respectively, and when the cost difference is 0, both pe(t) and ne(t) are determined as 0. Thus, the total sum of absolute cost-differences for traffic-routes is represented by "Σ(pe(t)+ne(t))", as described in formula (1), on the assumption that w(t)=1.

Device-allocating unit 123 determines an optimum device-allocation by calculating an optimum solution for the integer/linear programming problem that was generated as described above. Hereinafter, description will be given of an operational flowchart performed by device-allocating unit 123, with reference to FIG. 4.

Figure 4:
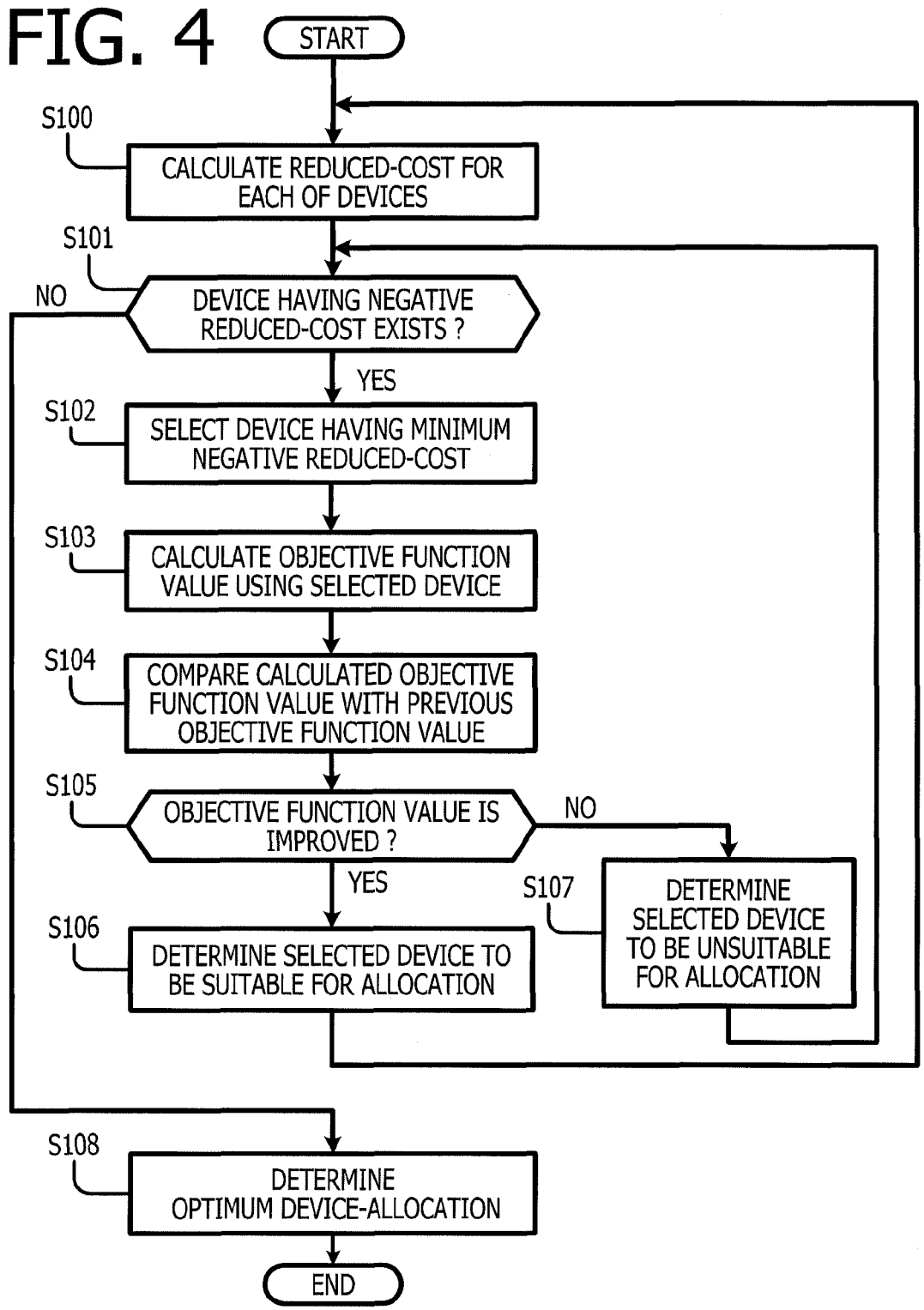
FIG. 4 is a diagram illustrating an example of an operational flowchart for determining an optimum device-allocation using an integer/linear programming problem, according to a first embodiment.

FIG. 4 is a diagram illustrating an example of an operational flowchart for determining an optimum device-allocation using an integer/linear programming problem, according to a first embodiment. The operational flowchart depicted in FIG. 4 may be performed by device-allocating unit 123.

FIG. 5 is a diagram illustrating an example of a device-allocation table for defining an integer/linear programming problem, according to an embodiment. The device-allocation table includes a device-cost for each of candidate-devices that are allowed to be allocated to a plurality of segments along a communication route in network 200 as depicted in FIG. 3, and includes a reduced-cost calculated for each of candidate-devices.

The device-allocation table of FIG. 5 indicates data used for obtaining a feasible device-allocation under the conditions that an objective-cost for traffic-route 1 (consisting of the sequence of segments 1' to 3') is set at 15, an objective-cost for traffic-route 2 (consisting of the sequence of segments 3' to 5') is set at 20, and an objective-cost for traffic-route 3 (consisting of the sequence of segments 1' to 6') is set at 40, as depicted in FIG. 3. Hereinafter, for ease of explanation, the condition that the objective-cost for traffic-route 1 is set at 15 will be expressed as "condition 1", the condition that the objective-cost for traffic-route 2 is set at 20 will be expressed as "condition 2", and the condition that the objective-cost for traffic-route 3 is set at 40 will be expressed as "condition 3".

In the device-allocation table of FIG. 5, row 1 represents variables used for defining the integer/linear programming problem. Variables xn (n=1, 2, . . . , 18) correspond to the candidate-devices that are allowed to be allocated to a plurality of segments, respectively. In the case, each of variables xn (n=1, 2, . . . , 18) takes on value 1 or 0, where "xn=1" means that a candidate-device corresponding to variable xn is selected as a candidate-device to be allocated to a segment, and "xn=0" means that a candidate-device corresponding to variable xn is not selected as a candidate-device to be allocated to a segment. Variables ne1 and pe1 take on values of negative and positive components of the cost-difference for condition 1, respectively. Variables ne2 and pe2 take on values of negative and positive components of the cost-difference for condition 2, respectively. Variables ne3 and pe3 take on values of negative and positive components of the cost-difference for condition 3, respectively.

In the case, a candidate-device that is selected as a device to be allocated to the communication route is interpreted as "a basic variable" used for solving an integer/linear programming problem. Further, with respect to a cost-difference, a component (ne or pe) that takes on a positive value is interpreted as a basic variable, and a negative component ne is interpreted as a basic variable when both of negative and positive components (ne and pe) take on values 0's. Any variable other than basic variables is interpreted as "a nonbasic variable" used for solving the integer/linear programming problem. Hereinafter, a candidate-device corresponding to a basic variable will be also expressed as "a basic candidate-device", and a candidate-device corresponding to a nonbasic variable will be also expressed as "a nonbasic candidate-device." The example depicted in FIG. 5 indicates an initial device-allocation in which x1, x4, x7, x10, x13, x15, ne1, ne2, and ne3 are selected as basic variables.

In the device-allocation table of FIG. 5, row 2 represents row-vector c that indicates a sequence of coefficients used for the objective function defined by formula (1), where weighing coefficient w(t) is set at 1 and coefficients for candidate-devices are set at 0's, respectively.

In the device-allocation table of FIG. 5, rows 3 to 11 represent matrix A that indicates coefficients for variables corresponding to candidate-devices and components of a cost-difference. In the case, each of rows 3 to 8 indicates a sequence of coefficients used for one of the constraints defined by formula (2) in which an equality is defined for each of segments. Variables xn (n=1, 2, . . . , 18) correspond to x(c) in formula (2) where "c on s" indicates candidate-device c allowed to be allocated to segment s, and a sequence of coefficients of variables xn (n=1, 2, . . . , 18), nei (i=1, 2, 3), and pei (i=1, 2, 3), used for each of the equalities of formula (2), is represented as one of rows 3 to 8 in matrix A as depicted in FIG. 5.

Further, each of rows 9 to 11 indicates a sequence of coefficients used for one of the constraints defined by Formula (3) in which an equality is defined for each of traffic-routes. Variables xn (n=1, 2, . . . , 18) correspond to x(c) where "c on t" indicates candidate-device c allowed to be allocated to segments along traffic-route t, and a sequence of coefficients of variables xn (n=1, 2, . . . , 18), and nei and pei (i=1, 2, 3), used for each of the equalities of formula (3), is represented as one of rows 9 to 11 in matrix A as depicted in FIG. 5.

In the device-allocation table of FIG. 5, row 12 represents reduced-cost vector $\hat{c}$ having entries each indicating a reduced-cost for one of variables xn (n=1 to 18) corresponding candidate-devices when x1, x4, x7, x10, x13, x15, ne1, ne2, and ne3 are selected as basic variables, where reduced-cost vector $\hat{c}$ may be calculated, for example, using a system of equations generated based on matrix A, as will be described by formula (4). In row FIG. 5, row 12 also includes entries corresponding to basic candidate-devices, and value 0's are calculated for the entries corresponding to basic candidate-devices.

Hereinafter, description will be given of operations for determining an optimum device-allocation by repeatedly obtaining an improved device-allocation that allows a more efficient device-allocation than a current device-allocation in which candidate-devices x1, x4, x7, x10, x13, and x15 are selected as basic candidate-devices (basic variables). In the case, "more efficient" means that the total sum of absolute cost-differences becomes smaller where a cost-difference is obtained as a difference between an objective-cost for a traffic-route and the total sum of device-costs of devices allocated to the traffic-route.

As depicted in FIG. 4, device-allocating unit 123, for example, performs operations as described below. Here, in FIG. 4, a candidate-device is expressed simply as "a device" for ease of explanation.

In operation S100, device-allocating unit 123 calculates a reduced-cost for each of candidate-devices that are allowed to be allocated to a plurality of segments, based on an objective function and constraint formulas for the integer/linear programming problem generated as described above.

FIGS. 6A, 6B, 6C are diagrams illustrating examples of matrix data used for calculating a reduced-cost, according to an embodiment. Here, description will be given of operations for calculating a reduced-cost, with reference to FIGS. 6A, 6B, 6C.

A reduced-cost $\hat{c}$ is represented by $$\hat{c} = c_N - \pi N \qquad \text{Formula (4)}$$

Here, N is a matrix corresponding to nonbasic variables. In other words, matrix N is a set of columns corresponding to nonbasic variables in matrix A depicted in FIG. 5. In FIG. 5, x1, x4, x7, x10, x13, x15, ne1, ne2, and ne3 are selected as basic variables in the initial device-allocation, and x2, x3, x5, x6, x8, x9, x11, x12, x14, x16, x17, x18, pe1, pe2, and pe3 are nonbasic variables. Further, $c_N$ is a set of columns corresponding to nonbasic variables in matrix c (in this case, matrix c is a row vector). In this case, since matrix c has only one row, the set of columns becomes a set of values corresponding to nonbasic variables. Further, π is represented by the following formula (5).

$$\pi = c_B B^{-1} \qquad \text{Formula (5)}$$

Here, B is a matrix indicating coefficients corresponding to basic variables that include variables corresponding to basic candidate-devices that are selected as devices to be allocated to a communication route in network 200. Within matrix A of FIG. 5, matrix B is a set of columns corresponding to basic variables. Matrix B obtained based on the example depicted in FIG. 3 and FIG. 5 is represented by FIG. 6A, and the inverse matrix $B^{-1}$ of matrix B is represented by FIG. 6B.

Using the above described formulas, reduced-cost vector $\hat{c}$ for nonbasic candidate-devices that are not currently selected as devices to be allocated to a communication route in network 200 is represented by formula (6) below.

$$\hat{c} = c_N - c_B B^{-1} N \qquad \text{Formula (6)}$$

In the case of the example depicted in FIG. 5, since each of elements in matrix c (in this case, elements in row vector c) is 0 except for cost-difference variables ne1, pe1, ne2, pe2, ne3, and pe3, matrix $c_N$ (row vector) becomes a zero vector by the neglect of cost-difference components. As a result, in the case of the example depicted in FIG. 5, reduced-cost vector $\hat{c}$ corresponding to candidate devices is represented by $$\hat{C} = -c_B B^{-1} N$$

where reduced-costs for cost-difference components are neglected.

In a so-called minimization problem intended to minimize an objective function value, the objective function value may be improved by replacing a current basic variable with a new basic variable selected from nonbasic variables whose reduced-cost is negative and has a large absolute value, in other words, a nonbasic variable having the minimum negative reduced-cost. Here, description returns to the operational flowchart of FIG. 4.

In operation S101, device-allocating unit 123 determines whether there exists a nonbasic candidate-device having a negative reduced-cost or not, by referring to the reduced-costs calculated for the nonbasic candidate-devices.

When there exists a nonbasic candidate-device having a negative reduced-cost (YES in operation S101), device-allocating unit 123 selects, from the nonbasic candidate devices, a nonbasic candidate-device that has the minimum negative reduced-cost among the nonbasic candidate-devices (in operation S102).

In operation S103, device-allocating unit 123 calculates an objective function value under the assumption that a basic candidate-device currently allocated to the communication route is replaced with the selected nonbasic candidate-device. Here, description will be given of calculation of an objective function value with reference to FIG. 7.

FIG. 7 is a schematic diagram illustrating an example of relationship between a device-allocation and an objective function value, according to an embodiment. FIG. 7 illustrates an example of calculating an objective function value for the initial device-allocation in which candidate-devices x1, x4, x7, x10, x13, and x15 are selected as basic candidate-devices to be allocated to the communication route. According to the above mentioned initial device-allocation, under condition 1, the total sum of device-costs (denoted by "TOTAL COST" in FIG. 7) of candidate-devices allocated to traffic-route 1 (consisting of a sequence of segments 1' to 3') becomes 12 (=1+7+4), and the absolute cost-difference between the total sum 12 and the objective cost 15 becomes 3. Under condition 2, the total sum of device-costs of candidate-devices allocated to traffic-route 2 (consisting of a sequence of segments 3' to 5') becomes 17 (=4+11+2), and the absolute cost-difference between the total sum 17 and the objective-cost 20 becomes 3. Under condition 3, the total sum of device-costs of candidate-devices allocated to traffic-route 3 (consisting of a sequence of segments 1' to 6') becomes 34 (1+7+4+11+2+9), and the absolute cost-difference between the total sum 34 and the objective-cost 40 becomes 6. Accordingly, in the case, the objective function, which is configured to satisfy all the conditions 1 to 3 and represented by formula (1), takes on an objective function value of 12 (=3+3+6) as depicted in FIG. 7. Here, description returns to FIG. 4.

In operation S104, device-allocating unit 123 determines whether an objective function value is improved when replacing a basic candidate-device with the nonbasic candidate-device selected in operation S102, by comparing the calculated objective function value with the previous objective function value.

When it is determined that the objective function value is improved when replacing the basic candidate-device with the selected nonbasic candidate-device (YES in operation S105), device-allocating unit 123 determines the nonbasic candidate-device that has been newly selected, to a new basic candidate-device suitable for allocation (in operation S106). Thereafter, device-allocating unit 123 repeats operations S100 to S105 so as to further improve the objective function value.

Meanwhile, when it is determined that the objective function value is not improved or degraded when replacing the basic candidate-device with the selected nonbasic candidate-device (NO in operation S105), device-allocating unit 123 determines the selected nonbasic candidate-device to be unsuitable for allocation (in operation S107). Thereafter, device-allocating unit 123 repeats operations S100 to S105 so as to select another nonbasic candidate-device capable of improving the objective function value.

When there exist no candidate-devices having negative reduced-costs left (NO in operation S101), device-allocating unit 123 determines the current device-allocation to be an optimum device-allocation that is to be used for allocating candidate-devices to the communication route in network 200 (in operation S108).

Figure 8A:

FIGS. 8A, 8B are diagrams illustrating an example of a sequence of feasible device-allocations that converge on an optimum device-allocation, according to a first embodiment. Hereinafter, with reference to FIGS. 8A, 8B, description will be given of a method in which a next feasible device-allocation is sequentially generated from a current feasible device-allocation while improving an objective function value until the objective function value is not improved any more so as to obtain an optimum objective function value. Here, it is assumed that, a cost-difference component having a positive value is selected as a basic variable when the value "pe+ne" is nonzero, and ne is selected as a basic variable when the value "pe+ne" is zero (not depicted in FIGS. 8A, 8B). Further, for $\hat{c}=0$ is set for basic candidate-devices so as to be distinguished from nonbasic-candidate-devices.

In device-allocation (1) of FIG. 8A, device-allocating unit 123 selects a nonbasic candidate-device having a negative reduced-cost of which the absolute value is maximum among all the nonbasic candidate-devices, that is, a nonbasic candidate-device having the minimum reduced-cost. In the example of FIG. 8A, device-allocating unit 123 selects nonbasic candidate-device x9 having the minimum reduced-cost −6 (denoted by an arrowed line in device-allocation (1) of FIG. 8A). Next, device-allocating unit 123 calculates an objective function value on the assumption that basic candidate-device x7 (denoted by $\hat{c}=0$ in FIG. 8A), which is currently selected as a device to be allocated to segment 3', is replaced with the selected candidate-device x9, as depicted in device-allocation (2) of FIG. 8A (as a mark, a circle is appended to a newly selected basic candidate-device).

In device-allocation (2) of FIG. 8A, device-allocating unit 123 calculates an objective function value and reduced-costs on the assumption that candidate-devices x1, x4, x9, x10, x13, and x15 are selected as basic candidate-devices. As depicted in device-allocation (2) of FIG. 8A, the objective function value calculated for device-allocation (2) becomes 6 which is improved compared to the objective function value calculated for device-allocation (1).

Therefore, device-allocating unit 123 determines the selected candidate-device x9 to be an alternative candidate-device suitable for allocation to segment 3', and select candidate-device x9 as a new basic candidate-device instead of candidate-device x7. In this case, a reduced-cost for each of nonbasic candidate-devices may change in response to replacing the currently-selected candidate-device (basic candidate-device) x7 with the new basic candidate-device x9. Therefore, device-allocating unit 123 recalculates reduced-costs for all the nonbasic candidate-devices, and repeats operations depicted in FIG. 4 so as to select another nonbasic candidate-device from other segments different from segment 3' from which the new basic candidate-device x9 has been selected this time.

In device-allocation (2) where candidate-devices x1, x4, x9 (new basic candidate-device), x10, x13, and x15 are being selected as basic candidate-devices (or currently-selected candidate-devices), device-allocating unit 123 selects nonbasic candidate-devices x3, x6, and x12 having the same minimum reduced-cost −4. Hereinafter, for ease of explanation, it is assumed that calculation of an objective function value by replacing a basic candidate-device with the selected nonbasic candidate-devices is performed in the order of the selected nonbasic candidate-devices x3, x6, and x12.

When replacing basic candidate-device x1 with the selected nonbasic candidate-device x3 within segment 1', the objective function value becomes 4 as depicted in device-allocation (3) of FIG. 8A, which is improved compared to the objective function value 6 calculated for device-allocation (2). Therefore, device-allocating unit 123 determines nonbasic candidate-device x3 to be an alternative candidate-device suitable for allocation to segment 1'. In the case, device-allocating unit 123 does not calculate objective function values for the remaining nonbasic candidate-devices x6 and x12 any more (denoted by dotted arrowed lines in device-allocation (2) of FIG. 8A) since the objective function value has been already improved by selecting the nonbasic candidate-devices x3 as the alternative candidate-device.

Device-selecting unit 123 calculates reduced-costs for device-allocation (3) where candidate-devices x3 (a new basic candidate-device), x4, x9, x10, x13, and x15 are selected as basic candidate-devices, and repeats operations depicted in FIG. 4 so as to select another nonbasic candidate-device from other segments different from segment 1' from which the new basic candidate-device x3 has been selected this time. In the case, device-allocating unit 123 selects nonbasic candidate-device x12 (of segment 4') having the minimum reduced-cost −4, based on the calculated reduced-costs as depicted in device-allocation (3) of FIG. 8A (denoted by a arrowed line). When replacing, within segment 4', the currently selected candidate-device x10 with the newly selected nonbasic candidate-device x12, the objective function value becomes 2 as depicted in device-allocation (4) of FIG. 8A, which is improved compared to the objective function value 4 calculated for device-allocation (3). Therefore, device-allocating unit 123 determines nonbasic candidate-device x12 to be an alternative candidate-device suitable for allocation to segment 4'.

In device-allocation (4) of FIG. 8A, device-allocating unit 123 calculates reduced-costs for nonbasic candidate-devices on the assumption that candidate-devices x3, x4, x9, x12 (new basic variable), x13, and x15 are being selected as basic candidate-devices, and repeats operations depicted in FIG. 4 so as to select another nonbasic candidate-device from the other segments different from segment 4' from which the new candidate-device x12 has been selected this time. In the case, device-selecting unit 123 selects nonbasic candidate-device x18 having minimum reduced-cost −3 (denoted by arrowed line), based on the calculated reduced-costs as depicted in device-allocation (4) of FIG. 8A. Here, when replacing the currently-selected candidate-device x15 in segment 6' with the selected nonbasic candidate-device x18, the objective function value becomes 5, as depicted in device-allocation (5) of FIG. 8B, which is degraded compared to the objective function value 2 of device-allocation (4). Therefore, device-allocating unit 123 determines the selected nonbasic candidate-device x18 to be unsuitable for allocation.

In the case, device-selecting unit 123 changes a device-allocation from device-allocation (5) to device-allocation (6) that has the same device allocation as device-allocation (4) except that candidate-device x18 was determined to be unsuitable for allocation. In device-allocation (6), device-selecting unit 123 selects nonbasic candidate-devices x7 and x17 that have the minimum negative reduced-cost −2 among the candidate-devices excluding candidate-device x18 that was determined to be unsuitable. However, either when replacing basic candidate-device x9 with nonbasic candidate-device x7 or when replacing basic candidate-device x15 with nonbasic candidate-device x17, the objective function value becomes a degraded value 4 (not depicted in FIG. 8B) compared to the objective function value 2 of device-allocation (4). Therefore, device-allocating unit 123 determines that these nonbasic candidate-devices x7 and x17 are also unsuitable for allocation in addition to nonbasic candidate-device x18 (as denoted by * in device-allocation (6) of FIG. 8B).

Then, in device-allocation (6) of FIG. 8B where candidate-devices x3, x4, x9, x12, x13, x15 are selected as basic candidate-devices, and x7, x17, x18 were determined to be unsuitable for allocation, device-allocating unit 123 selects nonbasic candidate-device x8 (denoted by arrowed line) that has the minimum reduced-cost among candidate-devices excluding candidate-devices x7, x17, and x18 that were determined to be unsuitable for allocation.

In device-allocation (6), when replacing the currently-selected basic candidate-device x9 with the selected nonbasic candidate-device x8 within segment 3', the objective function value becomes 1 as depicted in device-allocation (7) of FIG. 8B, which is improved compared to the objective function value 2 calculated for device-allocation (6). Therefore, device-allocating unit 123 determines the selected nonbasic candidate-device x8 to be an alternative candidate-device suitable for allocation to segment 3', and nonbasic candidate-device x8 is selected as a new basic candidate-device instead of the currently-selected basic candidate-device x9.

In device-allocation (7) of FIG. 8B, where candidate-devices x3, x4, x8, x12, x13, and x15 are selected as basic candidate-devices, device-allocating unit 123 further calculates an objective function value by selecting a nonbasic candidate-device that has the minimum negative reduced-cost. For example, device-allocating unit 123 calculates an objective function value when replacing the currently-selected basic candidate-devices with nonbasic candidate-devices in the ascending order of reduced-costs of the nonbasic candidate-devices, that is, in the order of nonbasic candidate-devices x6 (reduced-cost=−4), x9 (reduced-cost=−3), x18 (reduced-cost=−3), x14 (reduced-cost=−2), x17 (reduced-cost=−2), and x16 (reduced-cost=−1). In the case, the objective function value becomes a degraded value 3 when replacing the currently-selected basic candidate-device x4 with nonbasic candidate-device x6 within segment 2' (not depicted in FIG. 8B). The objective function value becomes a degraded value 2 when replacing the currently-selected basic candidate-device x8 with the nonbasic candidate-device x9 within segment 3' (not depicted in FIG. 8B). The objective function value becomes a degraded value 2 when replacing the currently-selected basic candidate-device x15 with the nonbasic candidate-device x18 within segment 6' (not depicted in FIG. 8B). When replacing the currently-selected candidate-device x13 with candidate-device x14 within segment 5', the objective function value becomes 1 which is not improved compared to the objective function value 1 calculated for device-allocation (7) (not depicted in FIG. 8B). When replacing the currently-selected candidate-device x15 with the nonbasic candidate-device x17 within segment 6', the objective function value becomes 1 which is not improved compared to device-allocation 7.

Finally, when replacing the currently-selected basic candidate-device x15 with nonbasic candidate-device x16 within segment 6', the objective function value becomes an improved value 0, as depicted in device-allocation (8) of FIG. 8B. Therefore, device-allocating unit 123 determines nonbasic candidate-device x16 to be an alternative candidate-device suitable for allocation to segment 6', and nonbasic candidate-device x16 is selected as a new basic candidate-device instead of the currently-selected basic candidate-device x15. In device-allocation (8), since the objective function value reached the minimum objective function value 0, device-allocating unit 123 ends the processing.

As described above, since the objective function takes on the minimum value (optimum value) for device-allocation (8) where candidate-devices x3, x4, x8, x12, x13, and x16 are selected as basic candidate-devices, device-allocating unit 123 determines device-allocation (8) to be an optimum device-allocation.

According to the above mentioned operations, a sequence of feasible device-allocations is generated by sequentially generating a next feasible device-allocation from a current feasible device-allocation while improving a objective function value until the objective function value is not improved any more. Then, the last one of the obtained sequence of feasible device-allocations is determined to be an optimum device-allocation for optimally allocating the candidate-devices to a communication route under the constraints imposed on the integer/linear programming problem. Here, the next feasible device-allocation is obtained from the current feasible device-allocation by replacing one of basic candidate-devices being used for the current feasible device-allocation, with an alternative candidate-device that is selected, from nonbasic candidate-devices not being used for the current device-allocation, based on reduced-costs calculated for the nonbasic candidate-devices.

According to the sequence of operations mentioned above, preferable allocation of candidate-devices may be determined without calculating objective function values for all the cases of replacing the currently-selected basic candidate-device with each of all the nonbasic candidate-devices. Here, a reduced-cost for each of nonbasic candidate-devices indicates the degree of a change in the objective function value that is caused by replacing the currently-selected basic candidate-device with each of nonbasic candidate-devices. Especially, in an integer/linear programming problem in which an objective function value is to be minimized, it is possible to efficiently select a nonbasic candidate-device that causes the objective function value to be improved by selecting an alternative candidate-device that is selected from nonbasic candidate-devices having negative reduced-costs, but not from all the nonbasic candidate-devices. In other words, by comparing reduced-costs for nonbasic candidate-devices with each other, nonbasic candidate-devices unable to improve the objective function value (for example, nonbasic candidate-devices having nonnegative reduced-costs) may be beforehand excluded from a set of nonbasic candidate-devices that are selected as an alternative candidate-device for calculating the objective function value.

As a result, only the nonbasic candidate-devices that have possibility of improving the objective function value may be selected without calculating a objective function value for all the nonbasic candidate-devices.

As mentioned above, an optimum device-allocation may be obtained by solving an integer/linear programming problem. However, when solving a large-scale problem using an integer/linear programming problem, it is often difficult to calculate an optimum solution in a short amount of time because of increasing amount of calculation. For example, in the case of calculating an optimum solution without using the above mentioned method (in other words, using the existing method), when identifying an alternative candidate-device that is able improve the objective function value, an objective function value is calculated for each of all the nonbasic candidate-devices by replacing the currently-selected basic candidate-device with the each of all the nonbasic candidate-devices. However, calculation of the objective function value causes matrix operations to be executed, requiring a high computation load and consuming a great deal of time.

According to the above mentioned operations, in a sequence of processing stages for obtaining a sequence of feasible device-allocations that converge on the optimum device-allocation, the amount of processing needed for generating a next feasible device-allocation having a possibility of improving an objective function value may be reduced, thereby allowing an efficient transition from a previous processing stage to a next processing stage. As a result, the total amount of processing needed for determining an optimum device-allocation may be reduced, and the optimum device-allocation may be determined in a smaller amount of time.

In the above description, an integer/linear programming problem for minimizing an objective function value was given as a representative example. However, an integer/linear programming problem for maximizing an objective function value may also be solved, for example, in such a manner that an objective function value is calculated by replacing a currently-selected basic candidate-device with a nonbasic candidate-device having a positive reduced-cost that is selected from nonbasic candidate-devices in the descending order of positive reduced-costs. Thus, like the case of minimizing an objective function value as described above, also in the case of maximizing an objective function value, the total amount of processing needed for obtaining an optimum device-allocation may be reduced, and the optimum device-allocation may be determined in a smaller amount of time.

Figure 9:
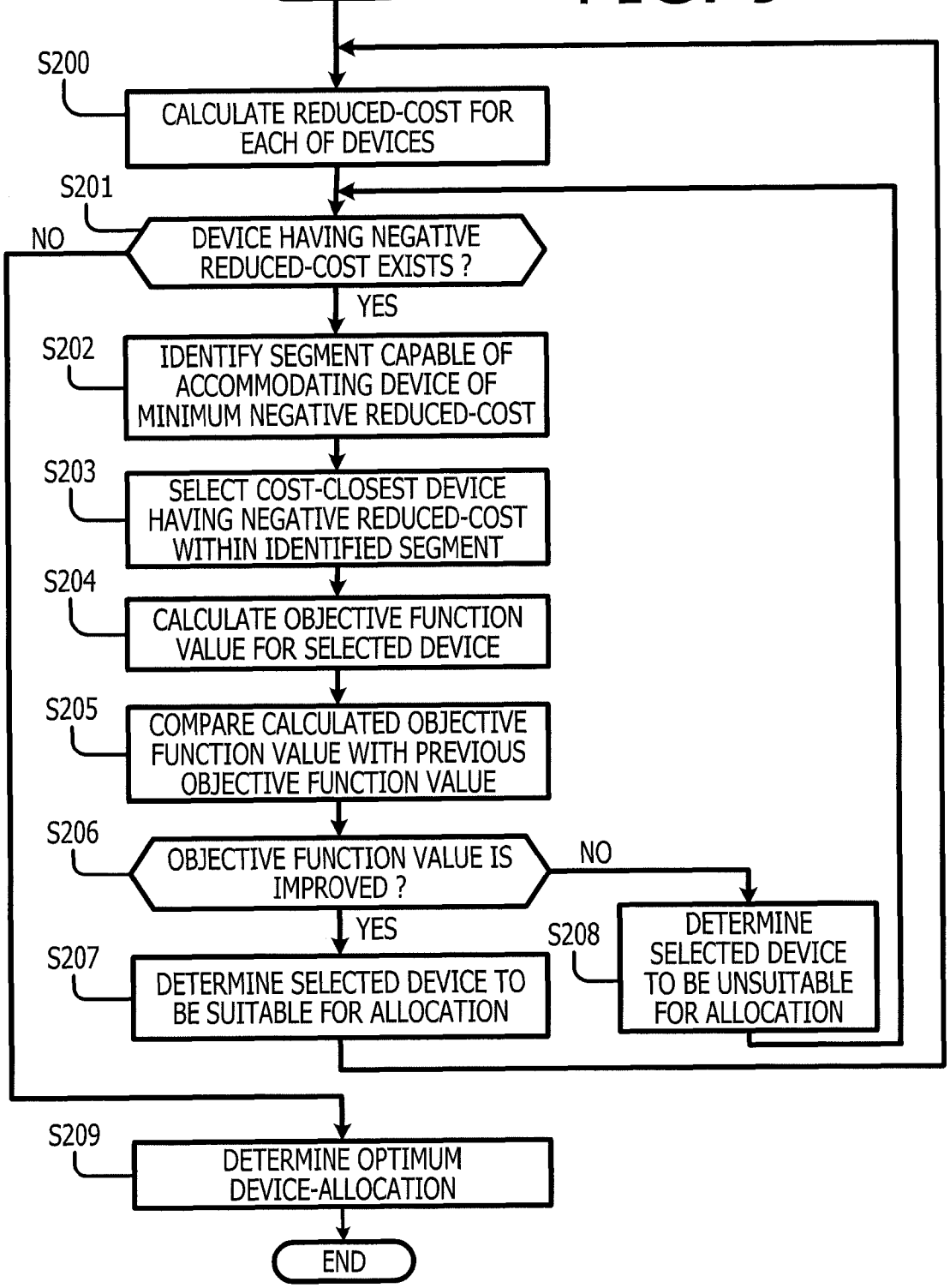
FIG. 9 is a diagram illustrating an example of an operational flowchart for determining an optimum device-allocation using an integer/linear programming problem, according to a second embodiment.

FIG. 9 is a diagram illustrating an example of an operational flowchart for determining an optimum device-allocation using an integer/linear programming problem, according to a second embodiment.

Device-allocating unit 123 of network-designing apparatus 100 is configured to generate a sequence of feasible device-allocations by sequentially generating a next feasible device-allocation from a current feasible device-allocation while improving an objective function value until the objective function value is not improved any more. Then, the last one of the sequence of feasible device-allocations is determined to be an optimum device-allocation for optimally allocating the candidate-devices to a communication route under the constraints imposed on the integer/linear programming problem.

According to the second embodiment, a segment capable of accommodating a nonbasic candidate-device having the minimum negative reduced-cost among the nonbasic candidate-devices is selected from the plurality of segments, and a nonbasic candidate-device that has a negative reduced-cost and has a device-cost closest to the basic candidate-device within the selected segment is selected as a nonbasic candidate-device having a possibility of improving an objective function value.

Figure 10:
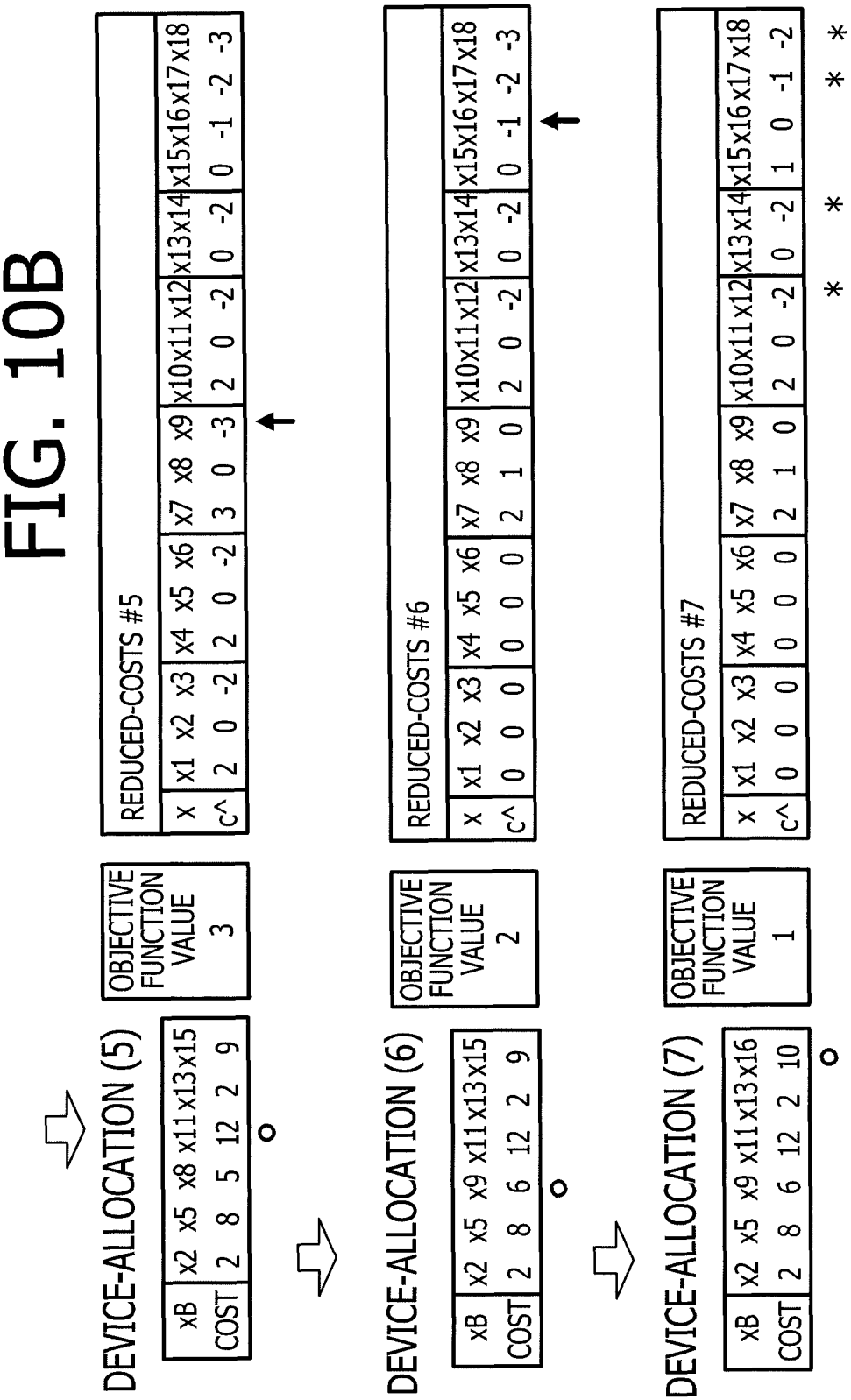
FIGS. 10A, 10B are diagrams illustrating an example of a sequence of feasible device-allocations that converge on an optimum device-allocation, according to a second embodiment.

FIGS. 10A, 10B are diagrams illustrating an example of a sequence of feasible device-allocations that converge on an optimum device-allocation, according to a second embodiment. The example of FIGS. 10A, 10B illustrates transitions between device-allocations in association with an objective function value and reduced-costs for nonbasic candidate-devices.

Hereinafter, description will be given of an operational flowchart for determining an optimum device-allocation, by referring to FIG. 9 together with FIGS. 10A, 10B. In FIG. 9, a candidate-device is expressed simply as "a device" for ease of explanation.

In operation S200 of FIG. 9, device-allocating unit 123 calculates a reduced-cost for each of nonbasic candidate-devices, for example, on the assumption that candidate-devices x1, x4, x7, x10, x13, and x15 are currently selected as basic candidate-devices as depicted device-allocation (1) of FIG. 10A.

In operation S201, device-allocating unit 123 determines whether there exists a nonbasic candidate-device having a negative reduced-cost or not, by referring to the calculated reduced-costs.

When there exists a nonbasic candidate-device having a negative reduced-cost (YES in operation S201), device-allocating unit 123 selects the candidate-device having the minimum reduced-cost among the nonbasic candidate-devices having negative reduced-costs, and identifies a segment capable of accommodating the selected nonbasic candidate-device having the minimum reduced-cost (in operation S202).

In operation S203, device-allocating unit 123 selects, from candidate-devices allowed to be allocated to the identified segment, a nonbasic candidate-device that has a negative reduced-cost and has a device-cost closest to the currently-selected candidate-device within the identified segment.

For example, in device-allocation (1) of FIG. 10A, device-allocating unit 123 selects candidate-device x9 as a nonbasic candidate-device having the minimum negative reduced-cost −6. Then, device-allocating unit 123 identifies segment 3' as a segment capable of accommodating the selected nonbasic candidate-device x9 having the minimum reduced-cost, and selects, from candidate-devices allowed to be allocated to the segment 3', nonbasic candidate-device x8 that has a negative reduced-cost and has a device-cost −3 closest to the device-cost of the currently-selected candidate-device x7 within segment 3'.

In operation S204, device-allocating unit 123 calculates a objective function value, for example, on the assumption that the currently-selected basic candidate-device x7 is replaced with the selected nonbasic candidate-device x8. In the case, the calculated objective function value becomes 9, as depicted in device-allocation (2) of FIG. 10A.

In operation S205, device-allocating unit 123 compares the calculated objective function value with the previous objective function value.

In operation S206, device-allocating unit 123 determines whether the calculated objective function value is improved compared to the previous objective function value, for example, whether the calculated objective function value becomes smaller than the previous objective function value. For example, as depicted in device-allocations (1) and (2) of FIG. 10A, the objective function value has been improved from 12 to 9.

Therefore, device-allocating unit 123 determines that the objective function value has been improved by replacing the basic candidate-device x7 with nonbasic candidate-device x8 (YES in operation S206), and determines nonbasic candidate-device x8 to be an alternative candidate-device suitable for allocation to segment 3' (in operation S207). Thereafter, device-allocating unit 123 repeats operations S201 to S206 so as to select another alternative candidate-device that further improves the objective function value.

In device-allocation (2) of FIG. 10A where candidate-devices x1, x4, x8, x10, x13, and x15 are selected as basic candidate-devices, device-allocating unit 123 recognizes segments 1', 2', and 4' as segments capable of accommodating candidate-devices having the minimum negative reduced-cost −4 among nonbasic candidate-devices. In the case, device-allocating unit 123 first identifies, for example, segment 1' having the least segment-ID among segments 1', 2', and 4', and selects nonbasic candidate-device x2 that has a negative reduced-cost and has a device-cost closest to the currently-selected candidate-device x1 within the identified segment 1', so as to generate device-allocation (3) by replacing the currently-selected basic candidate-device x1 with the selected nonbasic candidate-device x2. In the case, as depicted in device-allocation (3) of FIG. 10A, the objective function value becomes 7 which is improved from the previous objective function value 9 calculated for device-allocation (2). Therefore, device-allocating unit 123 determines nonbasic candidate-device x2 to be an alternative candidate-device suitable for allocation to segment 1'.

In device-allocation (3) of FIG. 10A where candidate-devices x2, x4, x8, x10, x13, and x15 are selected as basic candidate-devices, device-allocating unit 123 recognizes segments 2' and 4', as segments capable of accommodating nonbasic candidate-devices having the minimum negative reduced-cost −4. In the case, device-allocating unit 123 identifies, for example, segment 2' having the least segment-ID among segments 2' and 3', and selects nonbasic candidate-device x5 (as denoted by arrowed line) that has a negative reduced-cost and has a device-cost closest to the currently-selected basic candidate-device x4 within the identified segment 2', so as to generate device-allocation (4) by replacing the currently-selected basic candidate-device x4 with the selected nonbasic candidate-device x5. In the case, as depicted in device-allocation (4) of FIG. 10A, the objective function value becomes 5 which is improved from the previous objective function value 7 calculated for device-allocation (3). Therefore, device-allocating unit 123 determines nonbasic candidate-device x5 to be an alternative candidate-device suitable for allocation to segment 2'.

In device-allocation (4) of FIG. 10A where candidate-devices x2, x5, x8, x10, x13, and x15 are selected as basic candidate-devices, device-allocating unit 123 identifies segments 4' as a segment capable of accommodating a nonbasic candidate-device having the minimum negative reduced-cost −4, and selects nonbasic candidate-device x11 that has a negative reduced-cost and has a device-cost closest to the currently-selected basic candidate-device x10 within the identified segment 4', so as to generate device-allocation (5) by replacing the currently-selected basic candidate-device x10 with the selected nonbasic candidate-device x11. In the case, as depicted in device-allocation (5) of FIG. 10B, the objective function value becomes 3 which is improved from the previous objective function value 5 calculated for device-allocation (4). Therefore, device-allocating unit 123 determines nonbasic candidate-device x11 to be an alternative candidate-device suitable for allocation to segment 4'.

In device-allocation (5) of FIG. 10B where candidate-devices x2, x5, x8, x11, x13, and x15 are selected as basic candidate-devices, device-allocating unit 123 recognizes segments 3' and 6' as segments capable of accommodating nonbasic candidate-devices having the minimum negative reduced-cost −3 among nonbasic candidate-devices. In the case, device-allocating unit 123 first identifies, for example, segment 3' having the least segment-ID among segments 3' and 6', and selects nonbasic candidate-device x9 that has a negative reduced-cost and has a device-cost closest to the currently-selected candidate-device x7 within the identified segment 3', so as to generate device-allocation (6) by replacing the currently-selected basic candidate-device x7 with the selected nonbasic candidate-device x9 as depicted in device-allocation (6). In the case, as depicted in device-allocation (6) of FIG. 10B, the objective function value becomes 2 which is improved from the previous objective function value 3 calculated for device-allocation (5). Therefore, device-allocating unit 123 determines nonbasic candidate-device x9 to be an alternative candidate-device suitable for allocation to segment 3'.

In device-allocation (6) of FIG. 10B where candidate-devices x2, x5, x9, x11, x13, and x15 are selected as basic candidate-devices, device-allocating unit 123 identifies segment 6' as a segment capable of accommodating a candidate-device having the minimum negative reduced-cost −3. In the case, device-allocating unit 123 selects nonbasic candidate-device x16 that has a negative reduced-cost and has a device-cost closest to the currently-selected candidate-device x15 within the identified segment 6', so as to generate device-allocation (7) by replacing the currently-selected basic candidate-device x15 with the selected nonbasic candidate-device x16. In the case, as depicted in device-allocation (7) of FIG. 10B, the objective function value becomes 1 which is improved from the previous objective function value 2 calculated for device-allocation (6). Therefore, device-allocating unit 123 determines nonbasic candidate-device x16 to be an alternative candidate-device suitable for allocation to segment 6'.

In device-allocation (7) of FIG. 10B where candidate-devices x2, x5, x9, x11, x13, and x16 are selected as basic candidate-devices, device-allocating unit 123 recognizes segments 4', 5', and 6', as segments capable of accommodating nonbasic candidate-devices having the minimum negative reduced-cost −2. In the case, device-allocating unit 123 selects, for example, candidate-devices x12, X14, x17, and x18, in this order, that have negative reduced-costs and device-costs closest to the currently-selected candidate-device x15 within the identified segment so as to calculate objective function values. However, in the case, any one of the calculated objective function values is not improved from the previous objective function value 1 calculated for device-allocation (7) (denoted by * in device-allocation (7) of FIG. 10B). Therefore, device-allocating unit 123 determines device-allocation (7) to be an optimum device-allocation (in operation S209).

According to the second embodiment described above, in a sequence of processing stages for generating a sequence of feasible device-allocations, preferable nonbasic candidate-devices capable of improving an objective function value may be efficiently selected from all the nonbasic candidate-devices, based on reduced-costs calculated for the nonbasic candidate-devices. As a result, an optimum device-allocation may be obtained efficiently by reducing the total calculation amount needed for solving an integer/linear programming problem.

Figure 11:
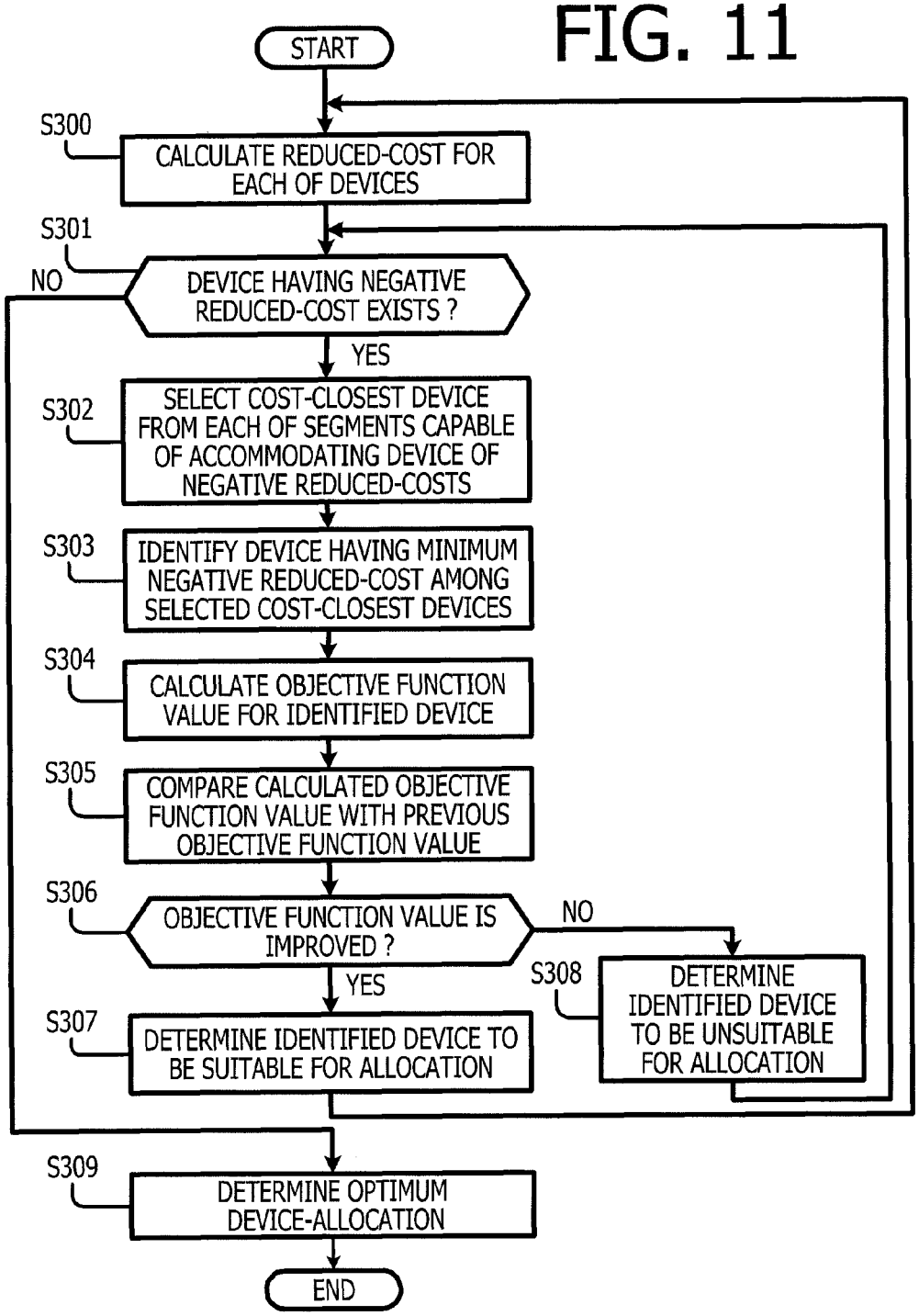
FIG. 11 is a diagram illustrating an example of an operational flowchart for determining an optimum device-allocation using an integer/linear programming problem, according to a third embodiment.

FIG. 11 is a diagram illustrating an example of an operational flowchart for determining an optimum device-allocation using an integer/linear programming problem, according to a third embodiment.

According to the third embodiment, a cost-closest candidate-device defined as a nonbasic candidate-device having a device-cost closest to the currently-selected basic candidate-device is selected for each of a plurality of segments. Further, a nonbasic candidate-device having the minimum negative reduced-cost among the selected cost-closest candidate-devices is identified. Then, an objective function value is calculated by replacing, within the segment capable of accommodating the identified candidate-device, the currently-selected basic candidate-device with the identified nonbasic candidate-device.

Figure 12A:

FIGS. 12A, 12B are diagrams illustrating an example of a sequence of feasible device-allocations that converge on an optimum device-allocation, according to a third embodiment. The example of FIGS. 12A, 12B illustrates transitions between device-allocations in association with an objective function value and reduced-costs for the nonbasic candidate-devices.

Hereinafter, description will be given of an operational flowchart for determining an optimum device-allocation, by referring to FIG. 11 together with FIGS. 12A, 12B. In FIG. 11, a candidate-device is expressed simply as "a device" for ease of explanation.

In operation S300, device-allocating unit 123 calculates a reduced-cost for each of nonbasic candidate-devices, for example, on the assumption that candidate-devices x1, x4, x7, x10, x13, and x15 are selected as basic candidate-devices.

In operation S301, device-allocating unit 123 determines whether there exists at least one nonbasic candidate-device having a negative reduced-cost, by referring to the calculated reduced-costs.

When there exists at least one nonbasic candidate-device having a negative reduced-cost (YES in operation S301), device-allocating unit 123 selects, from each of segments capable of accommodating the at least one nonbasic candidate-device, a cost-closest candidate-device that has a device-cost closest to the currently-selected basic candidate-device within the each of segments (in operation S302), so as to generate cost-closest candidate-devices.

In operation S303, device-allocating unit 123 identifies a nonbasic candidate-device that has the minimum negative reduced-cost among the generated cost-closest candidate-devices.

For example, in the case of device-allocation (1) of FIG. 12A, device-allocating unit 123 selects cost-closest candidate-devices, x2 (reduced-cost: −2), x5 (reduced-cost: −2), x8 (reduced-cost: −3), x11 (reduced-cost: −2), x14 (reduced-cost: −2), and x16 (reduced-cost: −1), whose device-costs are closest to the currently-selected basic candidate-devices x1, x4, x7, x10, x13, and x15, respectively. Then, device-allocating unit 123 identifies nonbasic candidate-device x8 having the minimum negative reduced-cost −3 among the selected cost-closest candidate-devices.

In operation S304, device-allocating unit 123 calculates an objective function value, for example, by replacing, within segment 3', currently-selected basic candidate-device x7 with the identified nonbasic candidate-device x8. In this case, the calculated objective function value becomes 9 as depicted in device-allocation (2) of FIG. 12A.

In operation S305, device-allocating unit 123 compares the calculated objective function value with the previous objective function value, for example, calculated for device-allocation (1).

In operation S306, device-allocating unit 123 determines whether the calculated objective function value is improved compared to the previous objective function value, for example, whether the calculated objective function value becomes smaller than the previous objective function value. For example, as seen from transition between device-allocations (1) and (2) of FIG. 12A, the objective function value is improved from 12 to 9.

In operation S307, when the calculated objective function value is improved compared to the previous objective function value, device-allocating unit 123 determines the identified nonbasic candidate-device to be an alternative candidate device suitable for allocation. For example, device-allocating unit 123 determines the identified nonbasic candidate-device x8 to be an alternative candidate-device suitable for allocation to segment 3'. Thereafter, device-allocating unit 123 repeats operations S300 to S306 so as to search for another alternative candidate-device that further improves the objective function value.

For example, in device-allocation (2) of FIG. 12A where candidate-devices x1, x4, x8, x10, x13, and x15 are selected as basic candidate-devices that are suitable for allocation to the communication route, device-allocating unit 123 identifies nonbasic candidate-device x9. Then, as seen from device-allocations (2) and (3) of FIG. 12A, by replacing the currently-selected basic candidate-device x8 with the identified nonbasic candidate-device x9, the objective function value becomes 6 which is improved compared to the previous objective function value 9 calculated for device-allocation (2). Therefore, device-allocating unit 123 determines nonbasic candidate-device x9 to be an alternative candidate-device suitable for allocation to segment 3'.

In device-allocation (3) of FIG. 12A where candidate-devices x1, x4, x9, x10, x13, and x15 are selected as basic candidate-devices, nonbasic candidate-devices x2, x5, x11, x14, and x16 are selected as cost-closest candidate-devices. In the case, since cost-closest candidate-devices x2, x5, x11, and x14 have the same minimum reduced-cost −2, for example, device-allocating unit 123 further sequentially selects, from the cost-closest candidate-devices, a candidate for replacement in the order of x2, x5, x11, x14, and x16. Device-allocating unit 123 first selects nonbasic candidate-device x2. As seen from device-allocations (3) and (4) of FIGS. 12A, 12B, by replacing currently-selected basic candidate-device x1 with the selected nonbasic candidate-device x2, the objective function value becomes 4 which is improved compared to the previous objective function value 6 calculated for device-allocation (3). Therefore, device-allocating unit 123 determines nonbasic candidate-device x2 to be an alternative candidate-device suitable for allocation to segment 1', and selects nonbasic candidate-device x2 as a new basic candidate-device instead of candidate-device X1. In the case, processing is not performed any more on the remaining cost-closest candidate-devices x5, x11, x14, and x16 (denoted by dotted arrows in device-allocation (3) of FIG. 12A).

In device-allocation (4) of FIG. 12B where candidate-devices x2, x4, x9, x10, x13, and x15 are selected as basic candidate-devices, nonbasic candidate-devices x3, x5, x11, x14, and x16 are selected as cost-closest candidate-devices. In the case, since nonbasic candidate-devices x3, x5, x11, and x14 have the same minimum reduced-cost −2, for example, device-allocating unit 123 further sequentially selects, from the cost-closest candidate-devices, a candidate for replacement in the order of x3, x5, x11, x14, and x16. Then, device-allocating unit 123 selects nonbasic candidate-devices x3 and x5, and calculates objective function values thereof by replacing basic candidate-devices x2 and x4 with nonbasic candidate-devices x3 and x5, respectively (not depicted in FIG. 12B). However, since the calculated objective function values are not improved (denoted by * in device-allocation (4) of FIG. 12B), device-allocating unit 123 next selects nonbasic candidate-device x11 as a candidate for replacement. As seen from device-allocation (5) of FIG. 10B, by replacing currently-selected basic candidate-device x10 with the selected nonbasic candidate-device x11, the calculated objective function value becomes 2 which is improved compared to the previous objective function value 4 calculated for device-allocation (4). Therefore, device-allocating unit 123 determines nonbasic candidate-device x11 to be an alternative candidate-device suitable for allocation to segment 4', and selects nonbasic candidate-device x11 as a new basic candidate-device instead of candidate-device X10. In the case, processing is not performed any more on the remaining cost-closest candidate-devices x14 and x16 (denoted by dotted arrows in device-allocation (4) of FIG. 12B).

In device-allocation (5) of FIG. 12B where candidate-devices x2, x4, x9, x11, x13, and x15 are selected as basic candidate-devices, nonbasic candidate-devices x3, x5, x12, x14, and x16 are selected as cost-closest candidate-devices. In the case, since nonbasic candidate-devices x3, x5, x12, and x14 have the same minimum reduced-cost −2, for example, device-allocating unit 123 further sequentially selects, from the cost-closest candidate-devices, a candidate for replacement in the order of x3, x5, x12, x14, and x16. Then, device-allocating unit 123 calculates objective function values by replacing basic candidate-devices x2, x4, x11, x13, and x15, with nonbasic candidate-devices x3, x5, x12, x14, and x16, respectively (not depicted in FIG. 12B). In the case, since the objective function values are not improved (denoted by * in device-allocation (5) of FIG. 12B), device-allocating unit 123 next selects, as a candidate for replacement, nonbasic candidate-devices x6 and x17 each having a device-cost next closest to the currently-selected basic candidate-device within the corresponding segment. Here, although the objective function value is not improved for nonbasic candidate-device x6 (denoted by * in device-allocation (5) of FIG. 12B), the objective function value is improved for nonbasic candidate-device x17. That is, as seen from device-allocation (6) of FIG. 10B, by replacing currently-selected basic candidate-device x16 with the nonbasic candidate-device x17, the objective function value becomes 0 which is improved compared to the previous objective function value 2 of device-allocation (5). Therefore, device-allocating unit 123 determines nonbasic candidate-device x17 to be an alternative candidate-device suitable for allocation to segment 6', and selects nonbasic candidate-device x17 as a new basic candidate-device instead of candidate-device X15.

In device-allocation (6) of FIG. 12B where candidate-devices x2, x4, x9, x11, x13, and x17 are selected as basic candidate-device, the objective function value becomes the minimum value 0. Therefore, device-allocating unit 123 determines device-allocation (6) to be the optimum device-allocation (in operation S309), and ends the processing.

According to the third embodiment described above, in a sequence of processing stages for generating a sequence of feasible device-allocations, alternative candidate-devices capable of improving an objective function value may be efficiently selected from nonbasic candidate-devices, based on reduced-costs calculated for the nonbasic candidate-devices. As a result, an optimum device-allocation may be obtained efficiently by reducing the total calculation amount needed for solving an integer/linear programming problem.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus for allocating devices to a communication route, comprising:
a memory for storing network topology information defining the communication route, and device information including a device-cost assigned to each of a plurality of candidate-devices that may be allocated to a plurality of segments on the communication route; and
a processor to:
generate an integer/linear programming problem for obtaining a feasible device-allocation allowing the candidate-devices to be allocated to the communication route under constraints determined based on the network topology information and the device information, the integer/linear programming problem defining an objective function for calculating an objective function value,
generate a sequence of feasible device-allocations, by sequentially generating a next feasible device-allocation from a current feasible device-allocation while improving the objective function value until the objective function value is not improved any more, and
determine a last one of the sequence of feasible device-allocations to be an optimum device-allocation having an optimum objective function value, wherein
the next feasible device-allocation is generated by replacing a basic candidate-device being used for the current feasible device-allocation with an alternative candidate-device so as to improve the objective function value, the alternative candidate-device being selected, from nonbasic candidate-devices not being used for the current feasible device-allocation, based on reduced-costs calculated for the nonbasic candidate-devices, a reduced-cost indicating a degree of a change in the objective function value when the change is caused by replacing a basic candidate-device with a nonbasic candidate-device having the reduced-cost.

2. The apparatus of claim 1, wherein
the next feasible device-allocation is generated by:
calculating, for the current feasible device-allocation, a first objective function value and the reduced-costs for the nonbasic candidate-devices;
generating, from the current feasible device-allocation, a feasible device-allocation by replacing a basic candidate-device with a first nonbasic candidate-device that is selected, from the nonbasic candidate-devices, based on the reduced-costs;
calculating a second objective function value for the generated feasible device-allocation;
comparing the second objective function value with the first objective function value; and
determining the generated feasible device-allocation to be the next feasible device-allocation having the second objective function value when the second objective function value is closer to an optimum objective function value determined by the integer/linear programming problem, than the first objective function value.

3. The apparatus of claim 1, wherein
a nonbasic candidate-device is selected, from the nonbasic candidate-devices having negative reduced-costs, in the ascending order of the negative reduced-costs, and the selected nonbasic candidate-device is determined to be the alternative candidate-device when the objective function value calculated using the selected nonbasic candidate-device as a new basic candidate-device is improved compared to the objective function value calculated for the current feasible device-allocation.

4. The apparatus of claim 1, wherein
a segment capable of accommodating a first nonbasic candidate-device having a minimum negative reduced-cost among the nonbasic candidate-devices is selected from the plurality of segments, and
a second nonbasic candidate-device that has a negative reduced-cost and has the device-cost closest to the device-cost of a basic candidate-device within the selected segment is determined to be the alternative candidate-device when the objective function value calculated using the second nonbasic candidate-device as a new basic candidate-device is improved compared to the objective function value calculated for the current feasible device-allocation.

5. The apparatus of claim 1, wherein
one or more segments each capable of accommodating a nonbasic candidate-device having a negative reduced-cost are selected from the plurality of segments,
cost-closest candidate-devices are generated by selecting, from each of the one or more segments, a first candidate-device having the device-cost closest to the device-cost of a basic candidate-device within the each of the one or more segments,
a second candidate-device that has a minimum negative reduced-cost among the generated cost-closest candidate-devices is determined to be the alternative candidate-device when the objective function value calculated using the second nonbasic candidate-device as a new basic candidate-device is improved compared to the objective function value calculated for the current feasible device-allocation.

6. A method for allocating devices to a communication route, comprising:
providing network topology information defining the communication route, and device information including a device-cost assigned to each of candidate-devices that may be allocated to a plurality of segments on the communication route;
generating an integer/linear programming problem for obtaining a feasible device-allocation allowing the candidate-devices to be allocated to the communication route under constraints determined based on the network topology information and the device information, the integer/linear programming problem defining an objective function for calculation an objective function value;
generating a sequence of feasible device-allocations by sequentially generating a next feasible device-allocation from a current feasible device-allocation while improving the objective function value until the objective function value is not improved any more; and
determining a last one of the sequence of feasible device-allocations to be an optimum device-allocation having an optimum objective function value, wherein
the next feasible device-allocation is generated by replacing a basic candidate-device being used for the current feasible device-allocation with an alternative candidate-device so as to improve the objective function value, the alternative candidate-device being selected, from nonbasic candidate-devices not being used for the current feasible device-allocation, based on reduced-costs calculated for the nonbasic candidate-devices, a reduced-cost indicating a degree of a change in the objective function value when the change is caused by replacing a basic candidate-device with a nonbasic candidate-device having the reduced-cost.

7. A non-transitory computer-readable medium storing instructions for allowing a computer system to execute a method for allocating devices to a communication route, the method comprising:

provinding network topology information defining the communication route, and device information including a device-cost assigned to each of candidate-devices that may be allocated to a plurality of segments on the communication route;

generating an integer/linear programming problem for obtaining a feasible device-allocation allowing the candidate-devices to be allocated to the communication route under constraints determined based on the network topology information and the device information, the integer/linear programming problem defining an objective function for calculation an objective function value;

generating a sequence of feasible device-allocations by sequentially generating a next feasible device-allocation from a current feasible device-allocation while improving the objective function value until the objective function value is not improved any more; and determining a last one of the sequence of feasible device-allocations to be an optimum device-allocation having an optimum objective function value, wherein the next feasible device-allocation is generated by replacing a basic candidate-device being used for the current feasible device-allocation with an alternative candidate-device so as to improve the objective function value, the alternative candidate-device being selected, from nonbasic candidate-devices not being used for the current feasible device-allocation, based on reduced-costs calculated for the nonbasic candidate-devices, a reduced-cost indicating a degree of a change in the objective function value when the change is caused by replacing a basic candidate-device with a nonbasic candidate-device having the reduced-cost.

* * * * *